United States Patent
Kusudou et al.

(10) Patent No.: US 10,016,959 B2
(45) Date of Patent: Jul. 10, 2018

(54) MULTILAYER FILM AND INTERLAYER FILM FOR LAMINATED GLASS THEREFROM

(71) Applicant: KURARAY CO., LTD., Kurashiki-shi (JP)

(72) Inventors: Takeshi Kusudou, Kurashiki (JP); Yoshiaki Asanuma, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 301 days.

(21) Appl. No.: 15/031,315

(22) PCT Filed: Oct. 25, 2013

(86) PCT No.: PCT/JP2013/079022
§ 371 (c)(1),
(2) Date: Apr. 22, 2016

(87) PCT Pub. No.: WO2015/059830
PCT Pub. Date: Apr. 30, 2015

(65) Prior Publication Data
US 2016/0271911 A1    Sep. 22, 2016

(51) Int. Cl.
| | | |
|---|---|---|
| *B32B 17/10* | (2006.01) | |
| *C08L 29/14* | (2006.01) | |
| *C08F 216/38* | (2006.01) | |
| *B29B 17/00* | (2006.01) | |
| *B29C 43/02* | (2006.01) | |
| *C08J 5/18* | (2006.01) | |
| *B29C 43/20* | (2006.01) | |
| *B29K 31/00* | (2006.01) | |
| *B29K 61/00* | (2006.01) | |
| *B29K 105/00* | (2006.01) | |
| *B29K 105/26* | (2006.01) | |
| *B29L 7/00* | (2006.01) | |
| *B29L 9/00* | (2006.01) | |

(52) U.S. Cl.
CPC .... *B32B 17/10761* (2013.01); *B29B 17/0005* (2013.01); *B29C 43/02* (2013.01); *B32B 17/10036* (2013.01); *B32B 17/10605* (2013.01); *C08F 216/38* (2013.01); *C08J 5/18* (2013.01); *C08L 29/14* (2013.01); *B29C 43/203* (2013.01); *B29K 2031/04* (2013.01); *B29K 2061/00* (2013.01); *B29K 2105/0038* (2013.01); *B29K 2105/0085* (2013.01); *B29K 2105/26* (2013.01); *B29K 2995/0018* (2013.01); *B29K 2995/0026* (2013.01); *B29L 2007/008* (2013.01); *B29L 2009/00* (2013.01); *B32B 2307/412* (2013.01); *B32B 2419/00* (2013.01); *B32B 2605/08* (2013.01); *C08J 2329/14* (2013.01); *C08L 2205/025* (2013.01)

(58) Field of Classification Search
CPC ........ B32B 17/10761; B32B 17/10605; B32B 17/10036; B32B 2307/412; B32B 2419/00; B32B 2605/08; B29K 2031/04; B29K 2105/26; B29K 2995/0018; B29K 2061/00; B29K 2105/0085; B29K 2105/0038; B29K 2995/0026; B29C 43/02; B29C 43/203; B29L 2007/008; B29L 2009/00; C08L 29/14; C08L 2205/025; C08J 5/18; C08J 2329/14; B29B 17/0005; C08F 216/38
See application file for complete search history.

(56) References Cited

U.S. PATENT DOCUMENTS

| | | | | |
|---|---|---|---|---|
| 4,556,619 A | * | 12/1985 | Ogata | G03F 7/038 430/17 |
| 6,211,289 B1 | * | 4/2001 | Tschirner | C09D 11/106 523/400 |
| 2002/0006508 A1 | * | 1/2002 | Shichiri | B32B 17/10036 428/339 |
| 2003/0111159 A1 | * | 6/2003 | Hashimoto | B32B 17/10018 156/99 |
| 2004/0024137 A1 | | 2/2004 | Kusudou et al. | |

(Continued)

FOREIGN PATENT DOCUMENTS

| | | |
|---|---|---|
| CN | 1495205 A | 5/2004 |
| CN | 101006023 A | 7/2007 |

(Continued)

OTHER PUBLICATIONS

International Search Report dated Jan. 21, 2014, in PCT/JP2013/079022 Filed Oct. 25, 2013.

(Continued)

*Primary Examiner* — Alexander Kollias
(74) *Attorney, Agent, or Firm* — Oblon, McClelland, Maier & Neustadt, L.L.P.

(57) ABSTRACT

There is provided a multilayer film comprising a layer (X) containing a polyvinyl acetal (I) having an acetalization degree of 55 to 80 mol %, a content of a vinyl ester monomer unit of 0.1 to 1.5 mol % and a viscosity-average degree of polymerization of 1,400 to 5,000; and a layer (Y) containing a polyvinyl acetal (II) having an acetalization degree of 70 to 85 mol %, a content of a vinyl ester monomer unit of 5 to 15 mol % and a viscosity-average degree of polymerization of 1,400 to 5,000, wherein the multilayer film satisfies formulas (1) and (2):

$$(A-B)/A < 0.80 \quad (1)$$

and $$1.00 \times 10^{-2} < (b/y)/(a/x) < 2.00 \times 10^{-1} \quad (2).$$

There is thus provided a film which exhibits sufficient sound-absorbability, resistance to coloration by heating, reduction in foreign materials (undissolved materials) and excellent recyclability.

7 Claims, 1 Drawing Sheet

(56) References Cited

U.S. PATENT DOCUMENTS

| | | | |
|---|---|---|---|
| 2004/0116013 A1* | 6/2004 | Yoshida | B32B 3/10 442/43 |
| 2006/0110593 A1* | 5/2006 | Fukatani | B32B 17/10036 428/328 |
| 2007/0134487 A1* | 6/2007 | Marumoto | B32B 17/10036 428/323 |
| 2009/0011230 A1* | 1/2009 | Rymer | B32B 17/10 428/339 |
| 2009/0163658 A1 | 6/2009 | Barsan et al. | |
| 2010/0028642 A1* | 2/2010 | Steuer | B32B 17/10761 428/220 |
| 2012/0021231 A1 | 1/2012 | Hirota et al. | |
| 2012/0288722 A1 | 11/2012 | Iwamoto et al. | |

FOREIGN PATENT DOCUMENTS

| | | |
|---|---|---|
| CN | 101637991 A | 2/2010 |
| CN | 102317229 A | 1/2012 |
| JP | 5-140211 | 6/1993 |
| JP | 5-155915 A | 6/1993 |
| JP | 2002-69126 A | 3/2002 |
| JP | 2003-252655 A | 9/2003 |
| JP | 2004-2108 A | 1/2004 |
| JP | 2011-508802 A | 3/2011 |
| JP | 2011-84468 | 4/2011 |
| JP | 2011-219670 A | 11/2011 |
| JP | 2011-219671 A | 11/2011 |
| JP | 2011-225449 A | 11/2011 |
| JP | 2011-251906 A | 12/2011 |
| JP | 2012-25645 A | 2/2012 |

OTHER PUBLICATIONS

Search Report dated Feb. 23, 2017 in Chinese Patent Application No. 201380081846.6 (with English translation).

* cited by examiner

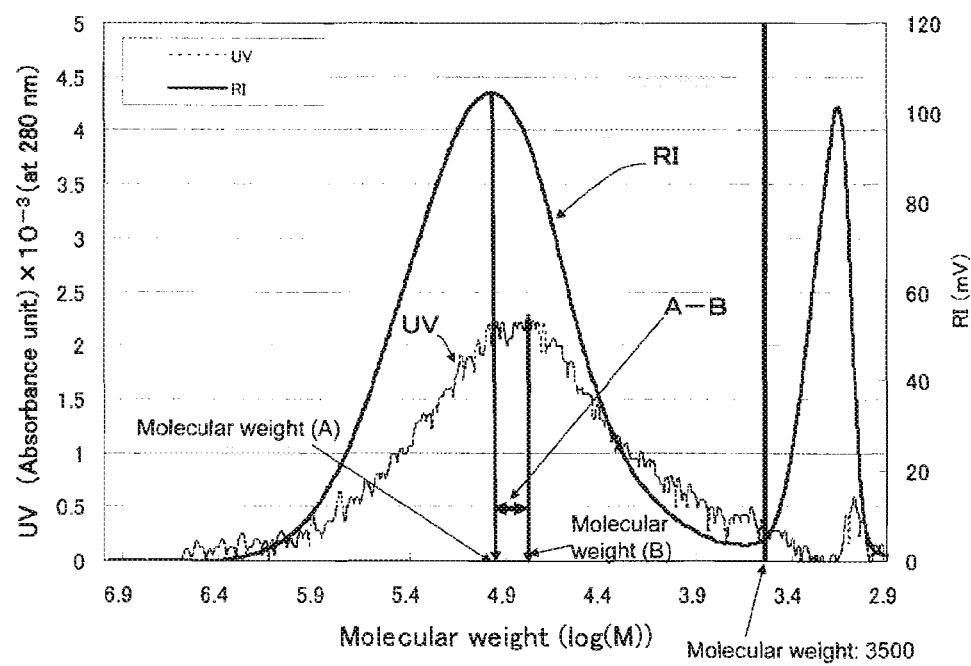

MULTILAYER FILM AND INTERLAYER FILM FOR LAMINATED GLASS THEREFROM

TECHNICAL FIELD

The present invention relates to a multilayer film which is sound-insulative. The present invention also relates to an interlayer film for a laminated glass from the multilayer film, and a laminated glass made of the interlayer film. The present invention further relates to a method for producing a monolayer film from a recovery of the multilayer film.

BACKGROUND ART

A polyvinyl acetal is produced by acetalization reaction of a polyvinyl alcohol (hereinafter, sometimes abbreviated as "PVA") and an aldehyde compound in water under acidic conditions. Since a polyvinyl acetal film is robust and has a unique structure where it has both hydrophilic hydroxyl groups and hydrophobic acetal groups, it has been used for various applications. Thus, a variety of polyvinyl acetals have been proposed. Among others, a polyvinyl formal produced from a PVA and formaldehyde, a polyvinyl acetal in the narrow sense produced from a PVA and acetaldehyde, and a polyvinyl butyral produced from a PVA and butylaldehyde are commercially important.

In particular, a polyvinyl butyral has been widely used as an interlayer film or the like for a laminated glass for an automobile and a building, and it is especially commercially important.

Meanwhile, a polyvinyl acetal has problems such as tendency to coloration by heating; and tendency to formation of foreign materials (undissolved materials) in a polyvinyl acetal film. To solve these problems, various means have been proposed.

Patent Reference Nos. 1 and 2 have described a method for inhibiting coloration of a polyvinyl acetal by acetalization at a particular hydroxide ion concentration under high temperature and pressure. Patent Reference No. 3 has described a method for inhibiting coloration of a polyvinyl acetal by adding a reducing agent after acetalization reaction and subsequent neutralization. However, a film produced using a polyvinyl acetal according to any of the methods described in Patent Reference Nos. 1 to 3 has tendency to contain foreign materials. Patent Reference No. 4 has described a method for inhibiting generation of coarse particles by adjusting a slurry concentration in resin particles obtained, in neutralization after acetalization reaction. Patent Reference No. 5 has described a method for inhibiting generation of coarse particles by regulating relationship between an acid catalyst and a surfactant used in acetalization. However, a film produced using a polyvinyl acetal according to any of the methods described in Patent Reference Nos. 4 and 5 has tendency to contain foreign materials. The film tends to be colored by heating. Thus, a polyvinyl acetal by which all of the above problems can be solved has been strongly desired.

Recently, various high performance products have been developed in applications of interlayer films for a laminated glass. For example, there has been disclosed an interlayer film for a laminated glass wherein a plurality of polyvinyl acetal layers having a different content ratio between a polyvinyl acetal and a plasticizer are laminated, in order for an interlayer film for a laminated glass to be highly sound-insulative (see, for example, Patent Reference Nos. 6 and 7). In the multilayer interlayer film for a laminated glass, a polyvinyl acetal in which each layer contains a different amount of average residual hydroxyl groups has been used, for allowing each layer to contain a different amount of a plasticizer.

In the light of a production cost, an interlayer film for a laminated glass is generally produced using an extruder. The above multilayer interlayer film for a laminated glass is produced by coextrusion. When an interlayer film for a laminated glass is produced by such a process, the process forms not only a certain amount of an end-remnant (trim) in a film end, but also an off-spec product, which cannot be used as a practical product due to its uneven composition and/or thickness.

When a trim or an off-spec product of a monolayer interlayer film for a laminated glass is recycled, there have been problems such as coloration of a film product by heating and generation of foreign materials (undissolved materials) in a film product. When a trim or off-spec product of a multilayer interlayer film for a laminated glass in which each layer has a different composition is recycled, there has been, in addition to the above problems, a problem of transparency reduction due to incompatibility between the components. In particular, when the above sound-insulative multilayer interlayer film for a laminated glass is recycled, it has been difficult to increase compatibility between polyvinyl acetals having different amounts of average residual hydroxyl groups constituting each layer. Thus, an interlayer film for a laminated glass produced has a problem of poor transparency.

In the light of energy saving and effective utilization of resources in recent years, yield improvement in the overall film-producing process has been a key issue. Thus, there has been needed to allow for recycling a multilayer interlayer film for a laminated glass comprising layers with different compositions, which has been difficult. That is, solving the above problems has been desired.

PRIOR ART REFERENCES

Patent References

Patent Reference No. 1: JP 2011-219670 A
Patent Reference No. 2: JP 2011-219671 A
Patent Reference No. 3: JP 5-140211 A
Patent Reference No. 4: JP 5-155915 A
Patent Reference No. 5: JP 2002-069126 A
Patent Reference No. 6: JP 2011-225449 A
Patent Reference No. 7: JP 2011-084468 A

SUMMARY OF THE INVENTION

Problems to be Solved by the Invention

To solve the above problems, an objective of the present invention is to provide a multilayer film which exhibits sufficient sound insulation, resistance to coloration by heating, reduction in foreign materials (undissolved materials) and excellent recyclability. Another objective is to provide a laminated glass wherein the multilayer film is used as an interlayer film. Another objective is to provide a film produced from a recovery of the multilayer film.

Means for Solving the Problems

The above problems can be solved by providing a multilayer film comprising a layer (X) containing a polyvinyl acetal (I) having an acetalization degree of 55 to 80 mol %, a content of a vinyl ester monomer unit of 0.1 to 1.5 mol % and a viscosity-average degree of polymerization of 1,400 to 5,000; and a layer (Y) containing a polyvinyl acetal (II) having an acetalization degree of 70 to 85 mol %, a content of a vinyl ester monomer unit of 5 to 15 mol % and a viscosity-average degree of polymerization of 1,400 to 5,000, wherein the multilayer film satisfies formulas (1) and (2):

$$(A-B)/A<0.80 \quad (1)$$

$$1.00\times10^{-2}<(b/y)/(a/x)<2.00\times10^{-1} \quad (2)$$

wherein

"A" is a peak-top molecular weight of a polymer component as measured by a differential refractive index detector in gel-permeation chromatographic (hereinafter, sometimes abbreviated as GPC) measurement of said multilayer film heated at 230° C. for 3 hours;

"a" is a signal strength at a peak-top molecular weight (A);

"B" is a peak-top molecular weight of a polymer component as measured by an absorptiometer (measuring wavelength: 280 nm) in GPC measurement of said multilayer film heated at 230° C. for 3 hours;

"b" is a signal strength at a peak-top molecular weight (B);

"x" is a signal strength at a peak-top molecular weight as measured by a differential refractive index detector in GPC measurement of a monodisperse polymethyl methacrylate (hereinafter, polymethyl methacrylate is sometimes abbreviated as PMMA); and "y" is a signal strength at a peak-top molecular weight as measured by an absorptiometer (measuring wavelength: 220 nm) in GPC measurement of said monodisperse PMMA.

Here, in GPC measurement of a film and a PMMA,

Mobile phase: hexafluoroisopropanol with 20 mmol/L sodium trifluoroacetate (hereinafter, hexafluoroisopropanol is sometimes abbreviated as HFIP)

Sample concentration: 1.00 mg/mL
Sample injection volume: 100 μL
Column temperature: 40° C.
Flow rate: 1.0 mL/min.

Preferably, the multilayer film satisfies formulas (3) and (4).

$$(A-C)/A<0.80 \quad (3)$$

$$5.00\times10^{-3}<(c/y)/(a/x)<7.00\times10^{-2} \quad (4)$$

wherein

"A" is as defined for formula (1);

"a", "x" and "y" are as defined for formula (2);

"C" is a peak-top molecular weight of a polymer component as measured by an absorptiometer (measuring wavelength: 320 nm) in GPC measurement of the film heated at 230° C. for 3 hours; and "c" is a signal strength at a peak-top molecular weight (C).

Preferably, the polyvinyl acetal (I) and the polyvinyl acetal (II) are polyvinyl butyrals (hereinafter, sometimes abbreviated as PVB).

A preferable embodiment of the present invention is an interlayer film for a laminated glass consisting of the multilayer film. Another preferable embodiment of the present invention is a laminated glass consisting of a plurality of glass sheets bonded via the interlayer film for a laminated glass.

Another preferable embodiment of the present invention is a method for producing a monolayer film comprising melt-kneading a recovery of the multilayer film and then forming a film from the melt-kneaded product. Here, more preferably, the recovery, a plasticizer, and a polyvinyl acetal (III) having an acetalization degree of 55 to 85 mol %, a content of a vinyl ester monomer unit of 0.1 to 15 mol % and a viscosity-average degree of polymerization of 1,400 to 5,000 are melt-kneaded before film forming.

Effects of the Invention

A multilayer film of the present invention exhibits sufficient sound-absorbability, resistance to coloration by heating, reduction in foreign materials (undissolved materials) and excellent recyclability. The multilayer film is, therefore, useful as an interlayer film for a laminated glass. Furthermore, a monolayer film produced from a recovery of the multilayer film is resistant to coloration and exhibits excellent transparency because of reduction in foreign materials (undissolved materials).

BRIEF DESCRIPTION OF THE DRAWINGS

FIG. 1 is a graph showing relationship between a molecular weight and a value as measured by a differential refractive index detector (RI), and a relationship between a molecular weight and an absorbance as measured by an absorptiometer (UV) (measuring wavelength: 280 nm) for a multilayer film of the present invention.

MODES FOR CARRYING OUT THE INVENTION

A multilayer film of the present invention has a layer (X) containing a polyvinyl acetal (I) having an acetalization degree of 55 to 80 mol %, a content of a vinyl ester monomer unit of 0.1 to 1.5 mol % and a viscosity-average degree of polymerization of 1,400 to 5,000; and a layer (Y) containing a polyvinyl acetal (II) having an acetalization degree of 70 to 85 mol %, a content of a vinyl ester monomer unit of 5 to 15 mol % and a viscosity-average degree of polymerization of 1,400 to 5,000, wherein the multilayer film satisfies formulas (1) and (2):

$$(A-B)/A<0.80 \quad (1)$$

$$1.00\times10^{-2}<(b/y)/(a/x)<2.00\times10^{-1} \quad (2)$$

wherein

"A" is a peak-top molecular weight of a polymer component as measured by a differential refractive index detector in GPC measurement of said multilayer film heated at 230° C. for 3 hours;

"a" is a signal strength at a peak-top molecular weight (A);

"B" is a peak-top molecular weight of a polymer component as measured by an absorptiometer (measuring wavelength: 280 nm) in GPC measurement of said multilayer film heated at 230° C. for 3 hours;

"b" is a signal strength at a peak-top molecular weight (B);

"x" is a signal strength at a peak-top molecular weight as measured by a differential refractive index detector in GPC measurement of a monodisperse polymethyl methacrylate; and "y" is a signal strength at a peak-top molecular weight as measured by an absorptiometer (measuring wavelength: 220 nm) in GPC measurement of said monodisperse polymethyl methacrylate.

Here, in GPC measurement of a film and a PMMA,

Mobile phase: HFIP with 20 mmol/L sodium trifluoroacetate

Sample concentration: 1.00 mg/mL (solvent: HFIP with 20 mmol/L sodium trifluoroacetate)

Sample injection volume: 100 μL

Column temperature: 40° C.

Flow rate: 1.0 mL/min.

In the present invention, GPC measurement is conducted using a GPC instrument equipped with a differential refractive index detector and an absorptiometer, which permits concurrent measurement using these detectors. A cell in a detection unit in the absorptiometer preferably has a cell length (optical path length) of 10 mm. The absorptiometer may be a type which measures absorption of UV ray with a particular wavelength or a type which spectrometrically measures UV-ray absorption having a wavelength within a particular range. A multilayer film to be measured is separated into individual molecular-weight components by a GPC column. A signal strength as measured by a differential refractive index detector is generally proportional to a concentration of film components (g/L). Meanwhile, components detected by an absorptiometer are only those having a structure which can absorb a given wavelength. For each molecular-weight component in the film, a concentration and an absorbance at a given wave length can be measured by the GPC measurement described above.

A solvent and a mobile phase used for dissolving a multilayer film and a PMMA measured in the above GPC measurement is HFIP with 20 mmol/L sodium trifluoroacetate. HFIP can dissolve a multilayer film of the present invention and a PMMA. Furthermore, addition of sodium trifluoroacetate allows for inhibiting adsorption of film components and/or a PMMA to a column filler. A flow rate and a column temperature in the GPC measurement are appropriately regulated, depending on the type of a column used and so on. In the GPC measurement, a flow rate is generally 1.0 mL/min and a column temperature is generally 40° C.

There are no particular restrictions to a GPC column used in the GPC measurement as long as it can separate components in a multilayer film of the present invention according to a molecular weight. Specifically, "GPC HFIP-806M" from Showa Denko K. K. or the like can be suitably used.

Herein, a standard PMMA is a monodisperse PMMA. As a standard PMMA, a monodisperse PMMA can be used, which is generally used as a standard for a calibration curve for measuring a molecular weight by GPC measurement. Measurement is conducted for several standard PMMAs with a different molecular weight, and from GPC elution volumes and molecular weights of the standard PMMAs, a calibration curve is formed. Herein, for measurement by a differential refractive index detector, a calibration curve formed using the detector is used, while for measurement by an absorptiometer, a calibration curve formed using the detector (measuring wavelength: 220 nm) is used. Using these calibration curves, a GPC elution volume is converted to a molecular weight, and a peak-top molecular weight (A) and a peak-top molecular weight (B) are determined.

Before the above GPC measurement, a multilayer film is heated at 230° C. for 3 hours. Herein, a multilayer film is heated by the following method. A multilayer film is heated by hot-pressing it at a pressure of 2 MPa and a temperature of 230° C. for 3 hours. Thus, difference in sample hue after heating is clearly reflected to a difference in an absorbance (that is, a signal strength detected by an absorptiometer). A thickness of a film to be heated is 600 to 800 μm, preferably about 760 μm which is a thickness of a common interlayer film for a laminated glass.

After heating, the multilayer film is dissolved in the above solvent (HFIP with sodium trifluoroacetate) to prepare a measurement sample. A concentration of the measurement sample is 1.00 mg/mL and an injection volume is 100 μL. Here, if a viscosity-average degree of polymerization of the polyvinyl acetal (I) or the polyvinyl acetal (II) in the multilayer film is over 2,400, an excluded volume is so increased that at a concentration of the measurement sample of 1.00 mg/mL, measurement may not be reproducibly conducted. In such a case, an appropriately diluted sample (injection volume: 100 μL) is used. A signal strength detected by an absorptiometer and a differential refractive index detector is proportional to a sample concentration. Therefore, using a concentration of a diluted sample and each signal strength observed, a measured value is converted to each signal strength at a measurement sample concentration of 1.00 mg/mL.

FIG. 1 is an exemplary graph showing a relationship between a molecular weight and a signal strength as measured by a differential refractive index detector, and a relationship between a molecular weight and a signal strength (absorbance) as measured by an absorptiometer (measuring wavelength: 280 nm), which were obtained by GPC measurement of a multilayer film of the present invention. Using FIG. 1, there will be further described GPC measurement in the present invention. In FIG. 1, the chromatogram indicated by "RI" is a plot of signal strength as measured by a differential refractive index detector to a molecular weight of a film component converted from an elution volume (horizontal axis). A peak observed around a molecular weight of 100,000 in the chromatogram is a peak of a polymer component. Herein, a molecular weight at such a peak position of a polymer component is a peak-top molecular weight (A) of the polymer component, and a signal strength at the peak-top molecular weight (A) is a signal strength (a). A film of the present invention contains a polyvinyl acetal with a viscosity-average degree of polymerization of 1,400 to 5,000, so that a peak-top molecular weight (A) of a polymer component is generally over 3,500. In FIG. 1, a peak observed around a molecular weight of 1,500 is a peak of a plasticizer contained in the film. When a plurality of peaks with a peak-top molecular weight over 3,500 is present in the chromatogram, a molecular weight at the highest peak is regarded as a peak-top molecular weight (A).

In FIG. 1, the chromatogram indicated by "UV" is a plot of a signal strength (absorbance) as measured by an absorptiometer (measuring wavelength: 280 nm) to a molecular weight of a film component converted from an elution volume (horizontal axis). A peak observed around a molecular weight of 50,000 in the chromatogram is a peak of a polymer component. Herein, a molecular weight at such a peak position of a polymer component is a peak-top molecular weight (B) of the polymer component, and a signal strength (absorbance) at the peak-top molecular weight (B) is a signal strength (b). A multilayer film of the present invention contains the polyvinyl acetal (I) and the polyvinyl acetal (II) with a viscosity-average degree of polymerization of 1,400 to 5,000, so that a peak-top molecular weight (B) of a polymer component is generally over 3,500. When a plurality of peaks with a peak-top molecular weight over 3,500 is present in the chromatogram, a molecular weight at the highest peak is regarded as a peak-top molecular weight (B).

In a multilayer film of the present invention, the following formula (1) is satisfied by a peak-top molecular weight (A) of a polymer component as measured by a differential refractive index detector and a peak-top molecular weight (B) of a polymer component as measured by an absorptiometer (measuring wavelength: 280 nm), obtained by GPC measurement as described above.

$$(A-B)/A<0.80 \tag{1}$$

A peak-top molecular weight (A) is a measure of a molecular weight of a polymer component in a multilayer film. A peak-top molecular weight (B) is derived from a component having absorption at 280 nm which is present in a polymer component. A peak-top molecular weight (A) is generally larger than a peak-top molecular weight (B), so that (A−B)/A is positive. The larger a peak-top molecular weight (B) is, the smaller (A−B)/A is, while the smaller a peak-top molecular weight (B) is, the larger (A−B)/A is. It indicates that a larger (A−B)/A means more components absorbing UV ray with a wavelength of 280 nm in low-molecular-weight components in a polymer component.

If (A−B)/A is 0.80 or more, more components absorbing UV rays with a wavelength of 280 nm are present in low-molecular-weight components as described above. In such a case, foreign materials (undissolved materials) are increased in a multilayer film obtained. Thus, foreign materials (undissolved materials) in a film produced using a recovery of the multilayer film (trim, off-spec product, and so on) are also increased, leading to poor transparency of the film. (A−B)/A is preferably less than 0.75, more preferably less than 0.70.

A multilayer film of the present invention satisfies the following formula (2).

$$1.00\times10^{-2}<(b/y)/(a/x)<2.00\times10^{-1} \tag{2}$$

In formula (2), "a" is a signal strength as measured by a differential refractive index detector at the peak-top molecular weight (A) in the GPC measurement, and "b" is a signal strength (absorbance) as measured by an absorptiometer (measuring wavelength: 280 nm) at the peak-top molecular weight (B).

In formula (2), "x" is a signal strength at a peak-top molecular weight as measured by a differential refractive index detector when a monodisperse PMMA is measured by GPC, and "y" is a signal strength (absorbance) at peak-top molecular weight as measured by an absorptiometer (measuring wavelength: 220 nm) when the monodisperse PMMA is measured by GPC. GPC measurement of a monodisperse PMMA is conducted as described for GPC measurement of a multilayer film, except that a multilayer film after heating is replaced by a monodisperse PMMA and a measuring wavelength of the absorptiometer is changed to 220 nm. A signal strength (x) is determined as described for a signal strength (a). A signal strength (y) is determined as described for a signal strength (b). A monodisperse PMMA used for determining "x" and "y" is preferably a PMMA with a weight-average molecular weight of about 85,000.

Here, (b/y)/(a/x) is a measure of a content of components having a structure absorbing UV ray with a wavelength of 280 nm in a polymer component in a multilayer film. It means that the larger this value is, the larger the content is. As described above, a signal strength as measured by a differential refractive index detector is substantially proportional to a concentration of a film component (g/L). Meanwhile, an absorptiometer detects only components having absorption at a measuring wavelength of 280 nm, and a signal strength (absorbance) as measured by an absorptiometer is proportional to a concentration of components having absorption at 280 nm. In general, a signal strength as measured by a differential refractive index detector is expressed in "millivolt", while a signal strength (absorbance) as measured by an absorptiometer is expressed in "absorbance unit (A.U.)".

Here, a signal strength (a) as measured by a differential refractive index detector and a signal strength (b) as measured by an absorptiometer varies depending on the type of a GPO device and the measurement conditions, and a ratio between these cannot be simply compared. In contrast, in the present invention, a ratio between a signal strength as measured by a differential refractive index detector and a signal strength as measured by an absorptiometer can be determined without variation depending on the type of a GPO device and the measurement conditions, as described below.

In the present invention, a ratio (a/x) of a signal strength (a) of a multilayer film as measured by a differential refractive index detector to a signal strength (x) of a monodisperse PMMA as measured by a differential refractive index detector, and a ratio (b/y) of a signal strength (b) of a multilayer film as measured by an absorptiometer to a signal strength (y) of a monodisperse PMMA as measured by an absorptiometer are determined, respectively. Then, a ratio between these, (b/y)/(a/x), is determined and is used as a measure of a content of components having a structure absorbing UV ray with a wavelength of 280 nm. By using a signal strength of a monodisperse PMMA as a standard as described above, the same measure can be used for evaluation, independently of the type of the device and the measurement conditions.

A multilayer film of the present invention preferably satisfies formula (2'), more preferably formula (2").

$$1.50\times10^{-2}<(b/y)/(a/x)<1.50\times10^{-1} \tag{2'}$$

$$2.00\times10^{-2}<(b/y)/(a/x)<1.00\times10^{-1} \tag{2''}$$

If (b/y)/(a/x) is $1.00\times10^{-2}$ or less, components absorbing UV ray with a wavelength of 280 nm are reduced in the polymer component of the multilayer film, as described above. Thus, foreign materials (undissolved materials) in the multilayer film increases. Consequently, foreign materials (undissolved materials) in a film produced using a recovery of the multilayer film also increases, leading to poor transparency of the film produced. In contrast, if (b/y)/(a/x) is $2.00\times10^{-1}$ or more, components absorbing UV ray with a wavelength of 280 nm are increased in the polymer component of the film. Thus, a multilayer film obtained is colored by heating. Furthermore, a film produced using a recovery of the multilayer film is also colored.

In the light of good balance between inhibition of coloration and reduction of foreign materials (undissolved materials) in a multilayer film of the present invention, it is preferable that in the GPC measurement, a peak-top molecular weight (A) as measured by a differential refractive index detector and a peak-top molecular weight (C) as measured by an absorptiometer (measuring wavelength: 320 nm) satisfy the following formula (3).

$$(A-C)/A<0.80 \tag{3}$$

A peak-top molecular weight (C) is measured as described for a peak-top molecular weight (B), except that in an absorptiometer, a measuring wavelength is 320 nm. A peak-top molecular weight (C) is derived from components having absorption at 320 nm in a polymer component in a multilayer film. In general, a peak-top molecular weight (A) is larger than a peak-top molecular weight (C), so that (A–C)/A is positive. The larger a peak-top molecular weight (C) is, the smaller (A–C)/A is, while the smaller a peak-top molecular weight (C) is, the larger (A–C)/A is. It indicates that a larger (A–C)/A means more components absorbing UV ray with a wavelength of 320 nm in low-molecular-weight components in a polymer component.

If (A–C)/A is 0.80 or more, more components absorbing UV rays with a wavelength of 320 nm are present in low-molecular-weight components as described above. In such a case, foreign materials (undissolved materials) may be increased in a multilayer film obtained. Thus, if the foreign materials (undissolved materials) are increased, foreign materials (undissolved materials) in a film produced using a recovery of the multilayer film are also increased, possibly leading to poor transparency of the film. (A–C)/A is preferably less than 0.75, more preferably less than 0.70.

Preferably, a multilayer film of the present invention satisfies formula (4).

$$5.00\times10^{-3}<(c/y)/(a/x)<7.00\times10^{-2} \quad (4)$$

In formula (4), "a". "x" and "y" are as defined for formula (2), and "c" is a signal strength (absorbance) as measured by an absorptiometer (measuring wavelength: 320 nm) at a peak-top molecular weight (C).

Here, (c/y)/(a/x) is a measure of a content of components having a structure absorbing UV ray with a wavelength of 320 nm in a polymer component of a multilayer film. The larger this value is, the larger the content is. It can be determined as described for (b/y)/(a/x) except that in an absorptiometer, a measuring wavelength is 320 nm.

A film of the present invention more preferably satisfies formula (4'), further preferably formula (4").

$$7.00\times10^{-3}<(c/y)/(a/x)<6.00\times10^{-2} \quad (4')$$

$$1.00\times10^{-2}<(c/y)/(a/x)<5.00\times10^{-2} \quad (4'')$$

If (c/y)/(a/x) is $5.00\times10^{-3}$ or less, components absorbing UV ray with a wavelength of 320 nm are reduced in the polymer component of the multilayer film, as described above. Thus, foreign materials (undissolved materials) in the multilayer film may increase. If the foreign materials (undissolved materials) are increased, foreign materials (undissolved materials) in a film produced using a recovery of the multilayer film are also increased, possibly leading to poor transparency of the film. In contrast, if (c/y)/(a/x) is $7.00\times10^{-2}$ or more, components absorbing UV ray with a wavelength of 320 nm are increased in the polymer component of the film. Thus, a multilayer film obtained may tend to be colored by heating. Furthermore, a film produced using a recovery of the multilayer film may also tend to be colored.

Herein, a viscosity-average degree of polymerization of a polyvinyl acetal (I) and a polyvinyl acetal (II) is expressed as a viscosity-average degree of polymerization of a starting PVA measured in accordance with JIS-K6726. Specifically, a PVA is re-saponified to a saponification degree of 99.5 mol % or more and purified, followed by measuring its limiting viscosity [η] in water at 30° C., which can be used for determining a viscosity-average degree of polymerization from the equation below. A viscosity-average degree of polymerization of a PVA is substantially equal to a viscosity-average degree of polymerization of a polyvinyl acetal as its acetalization product.

$$P=([\eta]\times10000/8.29)^{(1/0.62)}$$

A viscosity-average degree of polymerization of the above polyvinyl acetal is 1,400 to 5,000, preferably 1,500 to 3,500. If the viscosity-average degree of polymerization is less than 1400, strength of a multilayer film is poor. In contrast, if the polymerization degree is over 5,000, a melt viscosity is too high to form a film.

An acetalization degree of a polyvinyl acetal (I) used in the present invention is 55 to 80 mol %. If the acetalization degree is less than 55 mol %, its compatibility with a plasticizer is reduced, and foreign materials (undissolved materials) in a multilayer film increase. Foreign materials (undissolved materials) in a film produced using a recovery of the multilayer film also increase, leading to poor transparency of the film. A acetalization degree of a polyvinyl acetal (I) is preferably 60 mol % or more, more preferably 65 mol % or more. If the acetalization degree is more than 80 mol %, coloration may tend to occur. An acetalization degree of a polyvinyl acetal (I) is preferably 75 mol % or less.

An acetalization degree of a polyvinyl acetal (II) used in the present invention is 70 to 85 mol %. If the acetalization degree is more than 85 mol %, efficiency of an acetalization reaction is significantly reduced. And a multilayer film is colored by heating. Furthermore, a film produced using a recovery of the multilayer film is also colored. An acetalization degree of a polyvinyl acetal (II) is preferably 80 mol % less. If the acetalization degree is less than 70 mol %, foreign materials (undissolved materials) in a film may increase.

In the light of a good balance between resistance to colorization and the amount of foreign materials (undissolved materials) in a multilayer film produced, a difference (II-I) in an acetalization degree between a polyvinyl acetal (I) and a polyvinyl acetal (II) is preferably 2 mol % or more, more preferably 4 mol % or more.

An acetalization degree as used herein is a proportion of acetalized vinyl alcohol monomer units to the total monomer units constituting a polyvinyl acetal. Of vinyl alcohol monomer units in a starting PVA, those which have not been acetalized remain as vinyl alcohol monomer units in a polyvinyl acetal produced.

A content of a vinyl ester monomer unit in a polyvinyl acetal (I) used in the present invention is 0.1 to 1.5 mol %. If a content of a vinyl ester monomer unit is less than 0.1 mol %, a polyvinyl acetal cannot be stably produced and cannot be formed into a film. A content of a vinyl ester monomer unit is preferably 0.3 mol % or more, more preferably 0.5 mol % or more, further preferably 0.7 mol % or more. Meanwhile, a content of a vinyl ester monomer unit is preferably 1.2 mol % or less.

A content of a vinyl ester monomer unit in a polyvinyl acetal (II) used in the present invention is 5 to 15 mol %. If a content of a vinyl ester monomer unit is more than 15 mol %, a multilayer film produced is colored by heating. Furthermore, a film produced using a recovery of the multilayer film is also colored. A content of a vinyl ester monomer unit in a polyvinyl acetal (II) is preferably 13 mol % or less, more preferably 10 mol % or less. Meanwhile, a content of a vinyl ester monomer unit is preferably 6 mol % or more, more preferably 7 mol % or more. With a content of a vinyl ester monomer unit in a polyvinyl acetal (II) within the above range, a layer (Y) becomes a soft layer, and a multilayer film of the present invention exhibits excellent sound insulation performance while maintaining practical mechanical strength.

A content of a vinyl alcohol monomer unit in a polyvinyl acetal (I) used in the present invention is preferably 18.5 to 44.9 mol %. A content of a vinyl alcohol monomer unit in a polyvinyl acetal (II) used in the present invention is preferably 5 to 25 mol %.

In the present invention, it is preferable that a content (mol %) of a vinyl alcohol monomer unit in a polyvinyl acetal (I) is more than a content (mol %) of a vinyl alcohol monomer unit in a polyvinyl acetal (II). When there is a difference in a content of a vinyl alcohol monomer unit between a layer (X) and a layer (Y), affinity of a surfactant to a layer (Y) is higher than affinity of the surfactant to a layer (X), so that bleed out of the surfactant can be effectively inhibited. A difference (I-II) in a content of a vinyl alcohol monomer unit between a polyvinyl acetal (I) and a polyvinyl acetal (II) is preferably 5 mol % or more, more preferably 10 mol % or more. Meanwhile, the difference (I-II) is preferably 30 mol % or less.

A content of an acetalized monomer unit, a vinyl ester monomer unit and a monomer unit other than a vinyl alcohol monomer unit in a polyvinyl acetal (I) and a polyvinyl acetal (II) used in the present invention is preferably 20 mol % or less, more preferably 10 mol % or less, further preferably 5 mol % or less.

A polyvinyl acetal (I) and a polyvinyl acetal (II) used in the present invention are generally produced by acetalizing a PVA.

A saponification degree of a starting PVA used for production of a polyvinyl acetal is preferably 80 to 99.9 mol %, more preferably 82 to 99.7 mol %, further preferably 85 to 99.5 mol %, particularly preferably 87 to 99.3 mol %. If a saponification degree of a starting PVA is less than 80 mol %, foreign materials (undissolved materials) in a multilayer film produced may increase, and a multilayer film produced may tend to be colored by heating. Meanwhile, if the saponification degree is more than 99.9 mol %, a PVA may not be stably produced. A saponification degree of a PVA is measured in accordance with JIS-K6726.

A starting PVA can contain an alkali metal salt of a carboxylic acid, and its content expressed in terms of a mass of the alkali metal is preferably 0.50% by mass or less, more preferably 0.37% by mass or less, further preferably 0.28% by mass or less, particularly preferably 0.23% by mass or less. If a content of an alkali metal salt of a carboxylic acid in a starting PVA is more than 0.50% by mass, a multilayer film produced may tend to be colored. A content of an alkali metal salt of a carboxylic acid (expressed in terms of a mass of the alkali metal) can be determined from the amount of an alkali metal ion as measured by ICP emission spectrometry of an ash obtained by ashing a PVA in a platinum crucible.

Examples of a vinyl ester monomer which is used for producing a starting PVA include vinyl formate, vinyl acetate, vinyl propionate, vinyl valerate, vinyl caprate, vinyl laurate, vinyl stearate, vinyl acetate, vinyl benzoate, vinyl pivalate and vinyl versatate, particularly preferably vinyl acetate.

A starting PVA can be also produced by polymerizing a vinyl ester monomer in the presence of a thiol compound such as 2-mercaptoethanol, n-dodecyl mercaptan, mercaptoacetic acid and 3-mercaptopropionic acid to give a polyvinyl ester and then saponifying the polyvinyl ester. This process provides a PVA having terminal functional groups derived from the thiol compound.

A vinyl ester monomer can be polymerized by a known method such as bulk polymerization, solution polymerization, suspension polymerization and emulsion polymerization. Among these, bulk polymerization in a nonsolvent system and solution polymerization using a solvent such as an alcohol are generally employed. In the light of improving the effects of the present invention, solution polymerization where polymerization is conducted in a lower alcohol is preferable. Preferably, the lower alcohol is an alcohol having 3 or less carbon atoms such as, but not limited to, methanol, ethanol, propanol and isopropanol, and generally, methanol is used. When the polymerization reaction is conducted by bulk polymerization or solution polymerization, the reaction can be any of batch and continuous types. Examples of an initiator used in the polymerization reaction include known initiators including an azo initiator such as 2,2'-azobisisobutyronitrile, 2,2'-azobis(2,4-dimethyl-valeronitrile), and 2,2'-azobis(4-methoxy-2,4-dimethylvaleronitrile); and an organic peroxide initiator such as benzoyl peroxide, n-propyl peroxycarbonate and peroxydicarbonate as long as the effect of the present invention is not impaired. Among these, an organic peroxide initiator which has a half-life period of 10 to 110 min at 60° C. is preferably used, particularly preferably peroxydicarbonate. A polymerization temperature during the polymerization reaction is suitably, but not limited to, 5 to 200° C.

In radical polymerization of a vinyl ester monomer, as necessary, copolymerization can be conducted with a copolymerizable monomer as long as the effect of the present invention is not impaired. Examples of such a monomer include α-olefins such as ethylene, propylene, 1-butene, isobutene and 1-hexene; carboxylic acids or their derivatives such as fumaric acid, maleic acid, itaconic acid, maleic anhydride and itaconic anhydride; acrylic acid or its salts thereof; acrylic acid esters such as methyl acrylate, ethyl acrylate, n-propyl acrylate and isopropyl acrylate; methacrylic acid or its salts; methacrylic acid esters such as methyl methacrylate, ethyl methacrylate, n-propyl methacrylate and isopropyl methacrylate; acrylamide derivatives such as acrylamide. N-methylacrylamide and N-ethylacrylamide; methacrylamide derivatives such as methacrylamide, N-methylmethacrylamide and N-ethylmethacrylamide; vinyl ethers such as methyl vinyl ether, ethyl vinyl ether, n-propyl vinyl ether, isopropyl vinyl ether and n-butyl vinyl ether; hydroxyl-containing vinyl ethers such as ethyleneglycol vinyl ether, 1,3-propanediol vinyl ether and 1,4-butanediol vinyl ether; allyl ethers such as allyl acetate, propyl allyl ether, butyl allyl ether and hexyl allyl ether; monomers having an oxyalkylene group; hydroxy-containing α-olefins such as isopropenyl acetate, 3-buten-1-ol, 4-penten-1-ol, 5-hexen-1-ol,7-octen-1-ol, 9-decen-1-ol and 3-methyl-3-buten-1-ol; monomers having a sulfonic group such as ethylenesulfonic acid, allylsulfonic acid, methallylsulfonic acid and 2-acrylamide-2-methylpropanesulfonic acid; cationic-group-containing monomers such as vinyloxyethyltrimethylammonium chloride, vinyloxybutyltrimethylammonium chloride, vinyloxyethyldimethylamine, vinyloxymethyldiethylamine. N-acrylamide methyltrimethylammonium chloride. N-acrylamide ethyltrimethylammonium chloride. N-acrylamide dimethylamine, allyltrimethylammonium chloride, methallyltrimethylammonium chloride, dimethylallylamine and allylethylamine; and monomers having a silyl group such as vinyltrimethoxysilane, vinylmethyldimethoxysilane, vinyldimethylmethoxysilane, vin lame, vinylmethyldiethoxysilane, vinyldimethylethoxysilane, 3-(meth)acrylamide-propyltrimethoxysilane and 3-(meth)acrylamide-propyltriethoxysilane. The amounts of such a vinyl ester monomer and a copolymerizable monomer, which depend on their intended use, application and so on, are generally 20 mol % or less, preferably 10 mol % or less, more preferably 5 mol % or less, based on the total monomers used in the copolymerization.

A polyvinyl ester produced by the above process can be saponified in an alcohol solvent, to give a PVA.

A catalyst for a saponification reaction of a polyvinyl ester is generally an alkaline substance such as alkali metal hydroxides such as potassium hydroxide and sodium hydroxide; and alkali metal alkoxides such as sodium methoxide. The amount of the alkaline substance is preferably within the range of 0.002 to 0.2, particularly preferably within the range of 0.004 to 0.1, as a molar ratio based on the vinyl ester monomer unit in the polyvinyl ester. The saponification catalyst can be added in one portion at the initiation of the saponification reaction, or it can be added in part at the initiation of the saponification reaction, followed by adding the remaining part in the course of the saponification reaction.

Examples of a solvent used in the saponification reaction include methanol, methyl acetate, dimethyl sulfoxide, diethyl sulfoxide and dimethylformamide. Among these solvents, methanol is preferably used. In its use, a water content of methanol is adjusted preferably to 0.001 to 1% by weight, more preferably 0.003 to 0.9% by weight, particularly preferably 0.005 to 0.8% by weight.

The saponification reaction is conducted preferably at a temperature of 5 to 80° C., more preferably 20 to 70° C. A time needed for the saponification reaction is preferably 5 min to 10 hours, more preferably 10 min to 5 hours. The saponification reaction can be conducted either in batch style or in a continuous process. At the end of the saponification reaction, the remaining saponification catalyst can be, if necessary, neutralized. Examples of a neutralizing agent which can be used include organic acids such as acetic acid and lactic acid and ester compounds such as methyl acetate.

The alkaline substance containing an alkali metal which is added in the saponification reaction is generally neutralized by an ester such as methyl acetate which generates with progression of the saponification reaction, or neutralized by a carboxylic acid such as acetic acid added. Here, an alkali metal salt of the carboxylic acid such as sodium acetate is formed. As described above, a starting PVA preferably contain a predetermined amount of an alkali metal salt of a carboxylic acid.

To obtain such a PVA, a PVA after saponification can be washed with a washing liquid containing a lower alcohol such as methanol. The washing liquid can contain water in 20 parts by mass or less based on 100 parts by mass of the lower alcohol. The washing liquid can contain an ester such as methyl acetate which generates in the saponification process. Here, a content of such an ester is preferably, but not limited to, 1,000 parts by mass or less based on 100 parts by mass of the lower alcohol. The amount of a washing liquid used for washing is preferably 100 parts by mass to 10,000 parts by mass, more preferably 150 parts by mass to 5,000 parts by mass, further preferably 200 parts by mass to 1,000 parts by mass based on 100 parts by mass of a gelled PVA swollen with an alcohol. If the amount of the washing liquid is less than 100 parts by mass, the amount of an alkali metal salt of a carboxylic acid may be over the above range. Meanwhile, if the amount of the washing liquid is over 10,000 parts by mass, such increase of the amount does not contribute to improving washing effect. There are no particular restrictions to washing method; for example, a batch style can be employed, in which a PVA (swollen gel) and a washing liquid are charged in a chamber and stirred or left at 5 to 100° C. for about 5 min to 180 min for deliquoring, and the process is repeated until a content of an alkali metal salt of a carboxylic acid becomes within the above range. Alternatively, a continuous process can be employed, in which at the substantially same temperature and for the substantially same period as the batch style, a PVA is continuously fed from a tower top while a washing liquid is continuously fed from a tower bottom to contact and mix them.

An alkali metal salt of a carboxylic acid contained in a starting PVA can be a salt produced by neutralizing an alkali catalyst used in the above saponification process such as sodium hydroxide, potassium hydroxide and sodium methylate with a carboxylic acid; a salt produced by neutralization of a carboxylic acid in a saponification process which is added for preventing alcoholysis of a starting vinyl ester monomer such as vinyl acetate used in a polymerization process; a salt produced by neutralization of a carboxylic acid having a conjugated double bond in a saponification process when the carboxylic acid is used as an inhibitor added for terminating radical polymerization; a salt intentionally added; or the like. Specific examples include, but not limited to, sodium acetate, potassium acetate, sodium propionate, potassium propionate, sodium glycerate, potassium glycerate, sodium malate, potassium malate, sodium citrate, potassium citrate, sodium lactate, potassium lactate, sodium tartate, potassium tartate, sodium salicylate, potassium salicylate, sodium malonate, potassium malonate, sodium succinate, potassium succinate, sodium maleate, potassium maleate, sodium phthalate, potassium phthalate, sodium oxalate, potassium oxalate, sodium glutarate, potassium glutarate, sodium abietate, potassium abietate, sodium sorbate, potassium sorbate, sodium 2,4,6-octatriene-1-carboxylate, potassium 2,4,6-octatriene-1-carboxylate, sodium eleostearate, potassium eleostearate, sodium 2,4,6,8-decatetraene-1-carboxylate, potassium 2,4,6,8-decatetraene-1-carboxylate, sodium retinoate and potassium retinoate.

A PVA thus produced is acetalized to afford a polyvinyl acetal used for production of a film. There are no particular restrictions to the acetalization process, but it can be, for example, the following process. A PVA is heated to 80 to 100° C. to be dissolved in water and then is gradually cooled over 10 to 60 min, to give a PVA aqueous solution having a concentration of 3 to 40% by mass. At the time when the temperature is lowered to −10 to 30° C., an aldehyde and an acid catalyst are added to the aqueous solution. Maintaining the solution at a certain temperature, an acetalization reaction is carried out for 30 to 300 min. During the reaction, a polyvinyl acetal whose acetalization degree has reached a certain level is deposited. Then, the reaction solution is warmed to 25 to 80° C. over 30 to 300 min, and the temperature is maintained for 10 min to 25 hours (this temperature is referred to as a reaction temperature in the last stage). Subsequently, a neutralizing agent such as an alkali is, if necessary, added to the reaction solution to neutralize the acid catalyst, and then a deposit obtained is washed with water and dried to give a polyvinyl acetal.

Generally, in such a reaction or processing, agglomerated particles of a polyvinyl acetal generate, so that coarse particles tend to be formed. Generation of such coarse particles may cause dispersion between batches. In contrast, when a PVA produced using a given method described below is used as a starting material, generation of coarse particles is suppressed in comparison with a conventional product. As a result, when a polyvinyl acetal obtained is melt-formed into a film, a film with less foreign materials (undissolved materials) can be provided.

There are no particular restrictions to an acid catalyst used for the acetalization reaction, and any organic or inorganic acid can be used; examples include acetic acid, para-toluenesulfonic acid, nitric acid, sulfuric acid and hydrochloric acid. Among these, hydrochloric acid, sulfuric acid and nitric acid can be preferably used. When nitric acid is used, the acetalization reaction is generally accelerated so that productivity can be improved, while particles of a polyvinyl acetal obtained tend to be coarse, leading to increase in dispersion between batches. In contrast, when a PVA of the present invention is used as a starting material, generation of coarse particles is suppressed. As a result, when a polyvinyl acetal obtained is melt-formed into a film, a film with less foreign materials (undissolved materials) can be provided.

An aldehyde used for the acetalization reaction of a polyvinyl acetal is, but not limited to, preferably a conventionally known aldehyde having 1 to 8 carbon atoms, more preferably an aldehyde having 4 to 6 carbon atoms, particularly preferably n-butylaldehyde. In the present invention, a polyvinyl acetal produced using a combination of two or more aldehydes can be used.

In the present invention, each value as determined by GPC measurement of a multilayer film can be adjusted within the above range by, for example, 1) adding an antioxidizing agent to a polyvinyl acetal followed by forming a film, and 2) using a PVA obtained using a given method as a starting material for a polyvinyl acetal (I) and a polyvinyl acetal (II). These methods can be combined as appropriate.

For example, the antioxidizing agent used in the method in 1) can be, but not limited to, a phenolic antioxidizing agent, a phosphorous antioxidizing agent and a sulfur antioxidizing agent, preferably a phenolic antioxidizing agent, particularly preferably an alkyl-substituted phenolic antioxidizing agent.

Examples of a phenolic antioxidizing agent include acrylates such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; alkyl-substituted phenolic compounds such as 2,6-di-t-butyl-4-methylphenol, 2,6-di-t-butyl-4-ethylphenol, octadecyl-3-(3,5-)di-t-butyl-4-hydroxyphenyl) propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl) hyl)-2,4,8,10-tetraoxaspiro[5.5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl)propionate)methane and triethyleneglycol bis(3-(3-t-butyl-4-hydroxy-5-methylphenyl)propionate); triazine-containing phenolic compounds such as 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine and 2-octylthio-4,6-bis-(3,5-di-t-butyl-4-oxyanilino)-1,3,5-triazine.

Examples of a phosphorous antioxidizing agent include monophosphite compounds such as triphenyl phosphite, diphenyl isodecyl phosphite, phenyl diisodecyl phosphite, tris(nonylphenyl) phosphite, tris(dinonylphenyl) phosphite, tris(2-t-butyl-4-methylphenyl) phosphite, tris(cyclohexylphenyl) phosphite, 2,2-methylenebis(4,6-di-t-butylphenyl) octyl phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthr ene-10-oxide and 10-decyloxy-9,10-dihydro-9-oxa-10-phosphaphenanthrene; and diphosphite compounds such as 4,4'-butylidene-bis(3-methyl-6-t-butylphenyl di-tridecyl phosphite), 4,4'-isopropylidene-bis(phenyl-dialkyl(C12 to C15) phosphite), 4,4'-isopropylidene-bis(diphenyl monoalkyl(C12 to C15) phosphite), 1,1,3-tris(2-methyl-4-di-tridecyl phosphite-5-t-butylphenyl)butane, tetrakis(2,4-di-t-butylphenyl)-4,4'-biphenylene phosphite. Among others, a monophosphite compound is preferable.

Examples of a sulfur antioxidizing agent include dilauryl 3,3'-thiodipropionate, distearyl 3,3'-thiodipropionate, lauryl stearyl 3,3'-thiodipropionate, pentaerythritol-tetrakis-(β-lauryl-thiopropionate) and 3,9-bis(2-dodecylthioethyl)-2,4,8,10-tetraoxaspiro[5.5]undecane.

These antioxidizing agents can be used alone or in combination of two or more. The amount of an antioxidizing agent is, but not limited to, within the range of 0.001 to 5 parts by mass, preferably within the range of 0.01 to 1 parts by mass, based on 100 parts by mass of a polyvinyl acetal. If the amount of an antioxidizing agent is less than 0.001 parts by mass, it may not be sufficiently effective, while if the amount is more than 5 parts by mass, such increase of the amount does not contribute to improving its effect.

A PVA used in the method in 2) can be any of A) to H).

A) A vinyl ester monomer in which a radical polymerization inhibitor contained in a starting vinyl ester monomer has been preliminarily removed is used for polymerization.

B) A vinyl ester monomer in which the total content of impurities contained in a starting vinyl ester monomer is preferably 1 to 1200 ppm, more preferably 3 to 1100 ppm, further preferably 5 to 1000 ppm is used for radical polymerization. Examples of an impurity include aldehydes such as acetaldehyde, crotonaldehyde and acrolein; acetals such as acetaldehyde dimethyl acetal, crotonaldehyde dimethyl acetal and acrolein dimethyl acetal which are products of acetalization of the above aldehydes by the alcohol solvent; ketones such as acetone; and esters such as methyl acetate and ethyl acetate.

C) In a sequence of processes where a starting vinyl ester monomer is radically polymerized in an alcohol solvent and the unreacted monomer is recycled, for preventing alcoholysis or hydrolysis of a monomer by an alcohol or trace amounts of water, an organic acid including hydroxycarboxylic acids such as glycolic acid, glyceric acid, malic acid, citric acid, lactic acid, tartaric acid and salicylic acid; and polycarboxylic acids such as malonic acid, succinic acid, maleic acid, phthalic acid, oxalic acid and glutaric acid is added for inhibiting generation of an aldehyde such as acetaldehyde as a decomposition product as much as possible. The amount of such an organic acid is preferably 1 to 500 ppm, more preferably 3 to 300 ppm, further preferably 5 to 100 ppm, based on the starting vinyl ester monomer.

D) A solvent used for polymerization is a solvent with an impurity content of preferably 1 to 1200 ppm, more preferably 3 to 1100 ppm, further preferably 5 to 1000 ppm in total. Impurities contained in the solvent can be those described above as impurities contained in a starting vinyl ester monomer.

E) In radical polymerization of a vinyl ester monomer, a ratio of a solvent to the vinyl ester monomer is increased.

F) An organic peroxide is used as a radical polymerization initiator used for radical polymerization of a vinyl ester monomer. Examples of an organic peroxide include acetyl peroxide, isobutyl peroxide, diisopropyl peroxycarbonate, diallyl peroxydicarbonate, di-n-propyl peroxydicarbonate, dimyristyl peroxydicarbonate, di(2-ethoxyethyl) peroxydicarbonate, di(2-ethylhexyl) peroxydicarbonate, di(methoxyisopropyl) peroxydicarbonate and di(4-tert-butylcyclohexyl) peroxydicarbonate. In particular, a peroxydicarbonate with a half life of 10 to 100 min at 60° C. is preferably used.

G) When an inhibitor is added for inhibiting polymerization after radical polymerization of a vinyl ester monomer, the inhibitor is added in an amount of 5 molar equivalents or less to the remaining undecomposed radical polymerization initiator. The inhibitor can be a compound having a conjugated double bond with a molecular weight of 1,000 or less which can stabilize a radical for inhibiting a polymerization reaction. Specific examples include polyenes including conjugated dienes having a conjugation structure of two carbon-carbon double bonds such as isoprene, 2,3-dimethyl-1,3-butadiene, 2,3-diethyl-1,3-butadiene, 2-t-butyl-1,3-butadiene, 1,3-pentadiene, 2,3-dimethyl-1,3-pentadiene, 2,4-dimethyl-1,3-pentadiene, 3,4-dimethyl-1,3-pentadiene, 3-ethyl-1,3-pentadiene, 2-methyl-1,3-pentadiene, 3-methyl-1,3-pentadiene, 4-methyl-1,3-pentadiene, 1,3-hexadiene, 2,4-hexadiene, 2,5-dimethyl-2,4-hexadiene, 1,3-octadiene, 1,3-cyclopentadiene, 1,3-cyclohexadiene, 1-methoxy-1,3-butadiene, 2-methoxy-1,3-butadiene, 1-ethoxy-1,3-butadiene, 2-ethoxy-1,3-butadiene, 2-nitro-1,3-butadiene, chloroprene, 1-chloro-1,3-butadiene, 1-bromo-1,3-butadiene, 2-bromo-1,3-butadiene, fulvene, tropone, ocimene, phellandrene, myrcene, farnecene, cembrene, sorbic acid, a sorbic acid ester, a sorbic acid salt and abietic acid; conjugated trienes having a conjugation structure of three carbon-carbon double bonds such as 1,3,5-hexatriene, 2,4,6-octatriene-1-carboxylic acid, eleostearic acid, tung oil and cholecalciferol; conjugated polyenes having a conjugation structure of four or more carbon-carbon double bonds such as cyclooctatetraene, 2,4,6,8-decatetraene-1-carboxylic acid, retinol and retinoic acid. Here, for compounds having a plurality of stereoisomers such as 1,3-pentadiene, myrcene and farnesene, all of the stereoisomers can be used. Further examples include aromatic compounds such as p-benzoquinone, hydroquinone, hydroquinone monomethyl ether, 2-phenyl-1-propene, 2-phenyl-1-butene, 2,4-diphenyl-4-methyl-1-pentene, 3,5-diphenyl-5-methyl-2-heptene, 2,4,6-triphenyl-4,6-dimethyl-1-heptene, 3,5,7-triphenyl-5-ethyl-7-methyl-2-nonene, 1, 3-diphenyl-1-butene, 2,4-diphenyl-4-methyl-2-pentene, 3,5-diphenyl-5-methyl-3-heptene, 1,3,5-triphenyl-1-hexene, 2,4,6-triphenyl-4,6-dimethyl-2-heptene, 3,5,7-triphenyl-5-ethyl-7-methyl-3-nonene, 1-phenyl-1,3-butadiene and 1,4-diphenyl-1,3-butadiene.

H) A saponification reaction is conducted using an alcohol solution of a polyvinyl ester in which a remaining vinyl ester monomer has been removed as much as possible. A polyvinyl ester with a remaining-monomer removal rate of preferably 99% or more, more preferably 99.5% or more, further preferably 99.8% or more, is used.

The above A) to H) can be appropriately combined to afford a desired PVA. Preferably, a PVA thus produced is used as a starting material for a polyvinyl acetal (I) and a polyvinyl acetal (II).

Preferably, both layer (X) and layer (Y) contain a plasticizer. There are no particular restrictions to a plasticizer contained in the layer (X) and the layer (Y) as long as it does not impair the effect of the present invention and it is satisfactorily compatible with a polyvinyl acetal. The above plasticizers can be used alone or in combination of two or more. The plasticizer is preferably a diester of an oligoalkylene glycol having hydroxy groups at both ends with an aliphatic carboxylic acid, and a diester of an alkylenedicarboxylic acid with an aliphatic monohydric alcohol. Examples of an oligoalkylene glycol having hydroxy groups at both ends include ethylene glycol, diethylene glycol, triethylene glycol, tetraethylene glycol, 1,2-propylene glycol, 1,2-propylene glycol dimer and trimer, 1,3-propylene glycol, 1,3-propylene glycol dimer and trimer, 1,2-butylene glycol, 1,2-butylene glycol dimer and trimer, 1,4-butylene glycol, 1,4-butylene glycol dimer and trimer, 1,2-hexanediol, 1,6-hexanediol, 3-methyl-1,5-pentanediol, 1,2-octanediol, 1,8-octanediol, 1,9-nonanediol, 2-methyl-1,8-octanediol and 1,2-decanediool, 1,4-cyclohexanediol. Examples of an aliphatic carboxylic acid include acetic acid, propanoic acid, butanoic acid, pentanoic acid, hexanoic acid, heptanoic acid, octanoic acid, 2-ethylhexanoic acid, nonanoic acid and decanoic acid. Here, any combination of an oligoalkylene glycol with an aliphatic carboxylic acid can be used, and a plurality of oligoalkylene glycols can be combined with a plurality of carboxylic acids. Among these, a diester of triethylene glycol with 2-ethylhexanoic acid is preferable in the light of handleability (volatility during molding). Particularly, triethyleneglycol-di-2-ethyl hexanoate is preferable. Examples of an alkylenedicarboxylic acid include oxalic acid, malonic acid, succinic acid, glutaric acid, adipic acid, pimelic acid, suberic acid and sebacic acid. Examples of an aliphatic monohydric alcohol include methanol, ethanol, propanol, butanol, pentanol, hexanol, cyclohexanol, heptanol, octanol, 2-ethylhexanol, nonanol, decanol, 2-methoxyethanol, 2-ethoxyethanol, 2-propoxyethanol and 2-butoxyethanol. Here, any combination of an alkylenedicarboxylic acid with an aliphatic monohydric alcohol can be used, and a plurality of alkylenedicarboxylic acids can be combined with a plurality of aliphatic monohydric alcohols.

As the plasticizer, a hydroxy-containing aliphatic compound such as a hydroxy-containing aliphatic ester compound and a hydroxy-containing aliphatic ether compound can be also used. The number of hydroxy groups in these compounds is preferably 2 or more, more preferably 2 to 3. A hydroxy-containing aliphatic ester compound is a compound which contains at least one ester bond and has hydroxy group(s), and a hydroxy-containing aliphatic ether compound is a compound which contains at least one ether bond and has hydroxy group(s).

Examples of a hydroxy-containing aliphatic ester compound include, but not limited to, methyl ricinoleate, butyl ricinoleate, 2-ethylhexyl ricinoleate, (2-hydroxyethyl) ricinoleate, glycerin monoricinoleate, glycerin diricinoleate, glycerin triricinoleate, glycerin diricinoleate monooleate, (2-hydroxyethyl) oleate, (2-hydroxyethyl) 2-ethylhexanoate, {2-[2-(2-hydroxyethoxy)ethoxy]ethyl} ricinoleate, {2-[2-(2-hydroxyethoxy)ethoxy]ethyl} 2-ethylhexanoate, methyl ricinoleate, ethyl ricinoleate, butyl ricinoleate, octyl ricinoleate, octyl 6-hydroxyhexanoate, methyl 12-hydroxystearate and castor oil, as well as a hydroxy-containing polyester compound. Here, castor oil is a glycerin tricarboxylate obtained from castor-oil plant seeds, in which substantial carboxylate portion, generally 80 to 95% by mass, is ricinoleic acid esters and the remaining consists of palmitates, stearates, oleates, linoleates, linolenates and so on.

Examples of a hydroxy-containing polyester compound include a hydroxy-containing aliphatic polyester which is a condensation copolymer of a polycarboxylic acid and a polyol, a hydroxy-containing aliphatic polyester which is a polymer of a hydroxycarboxylic acid, and a hydroxy-containing aliphatic polycarbonate polyol.

A hydroxy-containing aliphatic polyester which is a condensation copolymer of a polycarboxylic acid and a polyol is produced by condensation-polymerizing an aliphatic polycarboxylic acid with an aliphatic polyol in an excess amount of the polyol.

Examples of an aliphatic polycarboxylic acid include, but not limited to, aliphatic dicarboxylic acids such as succinic acid, glutaric acid, adipic acid, suberic acid, sebacic acid, dodecanedioic acid and 1,2-cyclohexane dicarboxylic acid; and aliphatic tricarboxylic acids such as 1,2,3-propane tricarboxylic acid and 1,3,5-pentane tricarboxylic acid. Among these, an aliphatic dicarboxylic acid, particularly an aliphatic dicarboxylic acid having 6 to 10 carbon atoms is suitable. Examples of an aliphatic polyol include, but not limited to, aliphatic dihydric alcohols such as 1,2-propanediol, 1,3-propanediol, 1,2-butanediol, 1,3-butanediol, 1,4-butanediol, 1,2-hexanediol, 3-methyl-1,5-pentanediol, 1,2-octanediol, 1,2-nonanediol, 1,8-nonanediol, 1,9-nonanediol, 1,2-cyclohexanediol, 1,2-cyclohexanedimethanol, 1,4-cyclohexanedimethanol, diethylene glycol and triethylene glycol; aliphatic trihydric alcohols such as glycerol; and aliphatic tetrahydric alcohols such as erythritol and pentaerythritol. Among these, an aliphatic dihydric alcohol is suitable in the light of excellent weather resistance of a polyester obtained.

A hydroxy-containing aliphatic polyester which is a polymer of a hydroxycarboxylic acid is produced by condensation-polymerizing a hydroxycarboxylic acid. Examples of a hydroxycarboxylic acid include glycolic acid, lactic acid, 2-hydroxybutanoic acid, 3-hydroxybutanoic acid, 4-hydroxybutanoic acid, 6-hydroxyhexanoic acid and ricinoleic acid. A lactone compound which is an intramolecular condensation product of such a hydroxycarboxylic acid can be also used as a starting material. Examples of a lactone compound include, but not limited to, β-butyrolactone, δ-valerolactone, ε-caprolactone and 4-methyl-δ-valerolactone. When a lactone compound is used, a polyester can be produced by ring-opening polymerization. Among these, a 6-hydroxycarboxylic acid or ε-caprolactone is preferable in the light of excellent heat resistance of a polyester.

Examples of a hydroxy-containing aliphatic ether compound include ethyleneglycol monohexyl ether and a hydroxy-containing aliphatic polyether compound. Among these, a hydroxy-containing aliphatic polyether compound is preferable. A hydroxy-containing aliphatic polyether compound is a hydroxy-containing compound which is a polymer of an aliphatic polyol such as ethylene glycol and 1,2-propylene glycol; for example, polyethylene glycol, polypropylene glycol and so on are preferable.

A molecular weight of a hydroxy-containing aliphatic compound is, but not limited to, preferably 200 to 2,000, more preferably 220 to 1000, further preferably 250 to 700. A number average molecular weight based on a hydroxyl value of the above compound is, but not limited to, preferably 200 to 2,000, more preferably 220 to 1,700, further preferably 240 to 1,500. If the number average molecular weight based on a hydroxyl value is less than 200, a boiling point of the compound may not be sufficiently high, so that high volatility may cause a problem. If the number average molecular weight based on a hydroxyl value is more than 2,000, the compound may not be adequately compatible with a polyvinyl acetal. Here, a number average molecular weight based on a hydroxyl value is a value obtained from the equation: (the number of hydroxy per one molecule of a hydroxy-containing compound)/(the molar number of hydroxy per one gram of a hydroxy-containing compound [mol/g])=1000×(the number of hydroxy per one molecule of a hydroxy-containing compound)/((a hydroxyl value of a hydroxy-containing compound)/56). Here, when a mixture of two or more hydroxy-containing aliphatic compounds is used, the number of hydroxy per one molecule of a hydroxy containing compound is an average per one molecule of the hydroxy-containing compounds contained in the mixture.

A hydroxyl value of a hydroxy-containing aliphatic compound is, but not limited to, preferably 50 to 600 mg KOH/g, more preferably 70 to 500 mg KOH/g, further preferably 100 to 400 mg KOH/g. If the hydroxyl value is less than 50 mg KOH/g, transparency of a multilayer film obtained may be lowered. Meanwhile, if the hydroxyl value is more than 600 mg KOH/g, compatibility with a polyvinyl acetal may be lowered, leading to poor transparency or bleeding from a multilayer film. Here, a hydroxyl value in the present invention is a value as determined in accordance with a method described in JIS K1557-1 (2007). When a mixture of two or more hydroxy-containing compounds is used, a hydroxyl value is a hydroxyl value of the mixture (a mixture of hydroxy-containing compounds with the same blend ratio as a blend ratio of a plasticizer in each layer of a multilayer film of the present invention).

A plasticizer contained in a layer (X) and a layer (Y) can be an aromatic-ring containing compound such as an ether compound from a polyalkylene glycol with an aromatic alcohol, and an ester compound from a polyalkylene glycol with an aromatic carboxylic acid. A molecular weight of the compound is, but not limited to, preferably 200 to 2,000, more preferably 220 to 1,500, further preferably 250 to 1,000.

Specific examples of an ether compound from a polyalkylene glycol with an aromatic alcohol include polyoxyethylene alkyl phenyl ethers such as polyoxyethylene phenyl ether, polyoxyethylene methyl phenyl ether, polyoxyethylene ethyl phenyl ether, polyoxyethylene n-propyl phenyl ether, polyoxyethylene i-propyl phenyl ether, polyoxyethylene i-propyl methyl phenyl ether, polyoxyethylene n-butyl phenyl ether, polyoxyethylene i-butyl phenyl ether, polyoxyethylene t-butyl phenyl ether. The polyoxyethylene alkyl phenyl ether is preferably a monoether. Furthermore, a carbon number of an alkyl on an aromatic ring in the polyoxyethylene alkyl phenyl ether is preferably 4 or less.

Furthermore, an ether compound from a polyalkylene glycol with an aromatic alcohol can be an ether compound from an aromatic alcohol having a plurality of aromatic rings with a polyalkylene glycol, such as polyoxyethylene monobenzyl phenyl ether, polyoxyethylene dibenzyl phenyl ether and polyoxyethylene tribenzyl phenyl ether. Furthermore, an ether compound from an aromatic alcohol having a condensed aromatic ring with a polyalkylene glycol such as polyoxyethylene naphthyl ether can be used. These ether compounds are preferably monoethers. Furthermore, a compound etherized by a plurality of polyethylene glycols such as 2,2-bis(4-polyoxyethylenoxyphenyl)propane can be used.

Specific examples of an ester compound from a polyalkylene glycol with an aromatic carboxylic acid include an ester compound of an aromatic carboxylic acid such as benzoic acid, phthalic acid, isophthalic acid, terephthalic acid and trimellitic acid with a polyalkylene glycol such as polyethylene glycol.

Among the above compounds having an aromatic ring, a polyoxyethylene alkyl phenyl ether, an ether compound from an aromatic alcohol having a plurality of aromatic rings with polyoxyethylene and an ether compound from an aromatic alcohol having a condensed aromatic ring with a polyalkylene glycol are preferable and further preferably, these are monoethers.

Water solubility of a plasticizer used in the present invention is, but not limited to, preferably such that the amount dissolved in 100 g of water at 20° C. is 100 g or less. A dissolved amount of a plasticizer within the above range is preferable because when a multilayer film produced comes into contact with water, the plasticizer is more resistant to elution into water. A dissolved amount of the plasticizer in 100 g of water at 20° C. is more preferably 50 g or less, further preferably 10 g or less, particularly preferably 2 g or less.

A plasticizer content in a multilayer film of the present invention is preferably 20 to 100 parts by mass based on 100 parts by mass of a polyvinyl acetal (I) or a polyvinyl acetal (II) for each layer. If it is less than 20 parts by mass, a multilayer film or a laminated glass produced using the multilayer film as an interlayer film may be insufficient resistance to impact. On the other hand, if it is more than 100 parts by mass, a plasticizer may bleed out, so that a multilayer film produced may exhibit poor transparency and its adhesiveness to a glass may be reduced.

In the light of sound insulation performance, it is preferable that a difference between a plasticizer content based on 100 parts by mass of the polyvinyl acetal (II) in a layer (Y) and a plasticizer content based on 100 parts by mass of the polyvinyl acetal (I) in a layer (X) is 5 parts by mass or more. The content difference is more preferably 7.5 parts by mass or more, further preferably 10 parts by mass or more. The content difference is preferably 50 parts by mass or less.

Without departing from the spirit of the present invention, a layer (X) and a layer (Y) can contain conventionally known additives such as an adhesion-improving agent, a pigment, a dye, a stabilizer, a lubricant, a flame retardant, a processing aid, an antistatic, a coloring agent, an impact-resistance aid, a filler, an anti-moisture agent and so on.

There are no particular restrictions to a glass-transition temperature of a resin composition containing a polyvinyl acetal (I) constituting a layer (X). It can appropriately vary, depending on a purpose, and it is preferably within the range of 0 to 50° C., more preferably 5 to 45° C., further preferably 10 to 40° C. When a multilayer film of the present invention is used as an interlayer film for a laminated glass, a glass-transition temperature is preferably within the above range.

There are no particular restrictions to a glass-transition temperature of a resin composition containing a polyvinyl acetal (II) constituting a layer (Y). It can appropriately vary, depending on a purpose, and it is preferably within the range of 0 to 45° C., more preferably 0 to 35° C., further preferably 0 to 30° C. When a multilayer film of the present invention is used as an interlayer film for a laminated glass, a glass-transition temperature is preferably within the above range.

A layer (X) constituting a multilayer film of the present invention can be produced by, but not limited to, a process where a polyvinyl acetal (I) and additives are dissolved or dispersed in an organic solvent, the mixture is formed into a film and then the organic solvent is evaporated; a process wherein a resin composition containing a polyvinyl acetal (I) is melt-formed; or the like. In particular, the latter is preferable in the light of productivity and so on.

When a layer (X) is produced by the above melt-molding, there are no particular restrictions to a mixing method of starting materials, but in the light of productivity, mixing is conducted by melt kneading. There are no particular restrictions to a melt kneading method, and a known kneading apparatus can be used, including a single screw extruder, a twin screw extruder, Brabender, an open roll and a kneader. A resin temperature during melt kneading is preferably 150 to 250° C., more preferably 170 to 230° C. If a resin temperature is too high, decomposition of a polyvinyl acetal (I) is initiated, so that a content of volatile substances in a film after film formation increases. On the other hand, if the temperature is too low, volatile substances are insufficiently removed by a kneading apparatus, so that a content of volatile substances in a film after film formation increases. For efficiently removing volatile substances, it is preferable to remove volatile substances from a vent port by vacuuming the inside of the kneading apparatus.

A mixed molten material is melt-formed into a film. The molding can be conducted by any known method. A T-die is directly mounted in the melt kneading apparatus for forming a film, or alternatively, resin composition pellets are produced and then, a film can be separately formed.

A layer (Y) constituting a multilayer film of the present invention can be formed by, but not limited to, the method described as a method for producing a layer (X).

A multilayer film can be produced by a common molding process. Specifically, resin compositions for each layer are co-extruded to a die or feed block, or each layer is separately formed into a film and then the films are laminated.

There are no particular restrictions to a thickness of a layer (X) constituting a multilayer film of the present invention. A thickness of a layer (X) is preferably 0.05 to 1.2 mm, more preferably 0.07 to 1 mm, further preferably 0.1 to 0.7 mm. If the thickness is less than 0.05 mm, mechanical strength of a multilayer film may be reduced, and if it is more than 1.2 mm, flexibility of a multilayer film may be insufficient. Thus, if a thickness of a layer (X) is beyond the range of 0.05 to 1.2 mm, safety may be lowered in a laminated glass obtained using the multilayer film of the present invention as an interlayer film of the laminated glass.

There are no particular restrictions to a thickness of a layer (Y) constituting a multilayer film of the present invention. A thickness of a layer (Y) is preferably 0.01 to 1 mm, more preferably 0.02 to 0.8 mm, further preferably 0.05 to 0.5 mm. If the thickness is less than 0.01 mm, sound insulation performance may be lowered in a laminated glass obtained using the multilayer film of the present invention as an interlayer film of the laminated glass. If the thickness is more than 1 mm, increase in a thickness does not contribute to improving mechanical strength of the multilayer film.

A ratio (Y/X) of a thickness of a layer (Y) to a thickness of a layer (X) is, but not limited to, preferably 0.05 to 4, more preferably 0.07 to 2, further preferably 0.1 to 0.8 in the light of mechanical strength and exertion of sound insulation.

In a multilayer film of the present invention, at least one layer of the outermost layers is preferably a layer (X). Exemplary layer structures of such a multilayer film include a laminate in which both outermost layers are layer (X)s such as layer (X)/layer (Y)/layer (X) and layer (X)/layer (Y)/layer (X)/layer (Y)/layer (X); and a laminate in which at least one of outermost layers is a layer (X) such as layer (X)/layer (Y) and layer (X)/layer (Y)/layer (X)/layer (Y). In particular, when a laminate of the present invention is used as an interlayer film for a laminated glass, both outermost layers are preferably layer (X)s because adhesiveness of the laminate to a glass can be suitably adjusted.

A thickness of a multilayer film of the present invention is, but not limited to, preferably 0.2 to 3 mm, more preferably 0.25 to 2.5 mm, further preferably 0.3 to 2 mm. If the thickness is less than 0.2 mm, mechanical strength may be insufficient. If the thickness is more than 3 mm, flexibility may be insufficient.

An interlayer film for a laminated glass consisting of a multilayer film of the present invention is a suitable embodiment of the present invention. When an interlayer film for a laminated glass of the present invention is used for an application in which adhesiveness to a glass must be appropriately adjusted, the outermost layer can contain an adhesiveness modifier. A conventionally known adhesiveness modifier can be used, and for example, a sodium, potassium or magnesium salt of an organic acid such as acetic acid, propionic acid, butanoic acid, hexanoic acid, 2-ethylbutanoic acid and 2-ethylhexanoic acid can be used. These can be used alone or in combination of two or more. The optimal content of an adhesiveness modifier varies depending on an adhesiveness modifier used, and it is preferable to generally adjust adhesion force of a produced film to a glass to 3 to 10 as determined in Pummel test (described in International Publication WO 2003/033583 and others). When particularly high resistance to penetration is needed, the content is preferably adjusted to 3 to 6, and when higher glass shatterproof properties are needed, the content is preferably adjusted to 7 to 10. When higher glass shatterproof properties are required, absence of an adhesiveness modifier is also useful approach. In general, a content of an adhesiveness modifier in the outermost layer is preferably 0.0001 to 1% by mass, more preferably 0.0005 to 0.1% by mass, further preferably 0.001 to 0.03% by mass.

Another modifier for adjusting adhesiveness described above is a silane coupling agent. A content of a silane coupling agent in a layer (X) is preferably 0.01 to 5% by mass.

There are no particular restrictions to the surface shape of the above interlayer film for a laminated glass. In the light of handleability (bubble removability) during lamination with a glass, it is preferable that an uneven structure is formed on the surface to be contacted with a glass by a conventionally known method such as melt fracturing and embossing. An emboss height is, but not limited to, preferably 5 µm to 500 µm, more preferably 7 µm to 300 µm, further preferably 10 µm to 200 µm. If the emboss height is less than 5 µm, bubbles formed between a glass and an interlayer film during lamination with a glass may not be efficiently removed and if it is more than 500 µm, emboss formation is difficult. One or both sides of the interlayer film can be embossed, and in general, it is preferable to emboss both sides.

There are no particular restrictions to the uneven embossed pattern as long as the above particular conditions are met, and the pattern can be regularly or randomly distributed.

Such an emboss pattern can be formed by, as in conventional technique, employing an emboss roll method, profile extrusion; extrusion lip embossing utilizing melt fracturing and so on. In particular, for stably forming an embossed film on which fine uneven structure is uniformly formed, an emboss roll method is suitable.

An emboss roll used in an emboss roll method can be produced by using an engraved mill (mother mill) having a desired uneven pattern to transfer the uneven pattern to the surface of the metal roll. Alternatively, it can be produced using laser etching. Furthermore, after an uneven fine pattern is formed on the roll surface as described above, the surface can be blasted using an abrasive such as aluminum oxide, silicon oxide and glass beads to form a further finer uneven pattern.

An emboss roll used in an emboss roll method is preferably processed to make it mold-releasable. If a roll without being conducted a releasing process is used, a trouble of difficulty in releasing from a roll tends to occur depending on the conditions. The releasing process can be conducted by conventionally known technique such as silicone treatment, Teflon® treatment and plasma treatment.

A laminated glass in which a plurality of glass sheets are bonded via the above interlayer films for a laminated glass is a suitable embodiment of the present invention. The laminated glass can be produced by sandwiching the above interlayer film between at least two glass sheets and bonding the interlayer film by heating. There are no particular restrictions to a glass used for the above laminated glass, and examples include inorganic glasses such as a float plate glass, a tempered plate glass, a polished plate glass, a figured glass, a wire-reinforced plate glass and a heat-absorbing plate glass and conventionally known organic glasses such as polymethyl methacrylate and polycarbonate. These can be either colorless or colored and either transparent or opaque. These can be used alone or in combination of two or more. A thickness of the glass is, but not limited to, preferably 100 mm or less. There are no particular restrictions to the shape of the above glass, and the glass can be a simple flat plate glass and a glass having curvature such as an automobile windshield.

The above laminated glass can be produced by a conventionally known method such as a method using a vacuum laminator, a method using a vacuum bag, a method using a vacuum ring and a method using a nip roll. Alternatively, after temporary pressure bonding using such a method, a laminate obtained can be placed in an autoclave.

When a vacuum laminator is used, glasses and interlayer films are laminated under the production conditions; for example, under a reduced pressure of $1 \times 10^{-6}$ to $3 \times 10^{-2}$ MPa at a temperature of 100 to 200° C., particularly 130 to 160° C. A method using a vacuum bag or vacuum ring is described in, for example, EP Patent No. 1235683, and for example, lamination is conducted under a pressure of about $2 \times 10^{-2}$ MPa at a temperature of 130 to 145° C.

A production method using a nip roll can be a method where a material is degassed by a roll at a temperature equal to or lower than a flow initiation temperature of a resin composition constituting the outermost layer and then pressure-bonded at a temperature around the flow initiation temperature. Specifically, the material is heated to 30 to 70° C. by, for example, an infrared heater, degassed by a roll, heated to 50 to 120° C. and then pressure-bonded by a roll.

When the material is subjected to temporary pressure bonding using such a method, followed by placing a laminate obtained in an autoclave for further pressure bonding, the operation conditions of the autoclave process can be appropriately chosen, depending on a thickness and a configuration of a laminated glass, and for example, preferably, the material is processed under a pressure of 1.0 to 1.5 MPa at a temperature of 130 to 145° C. for 0.5 to 3 hours.

A multilayer film of the present invention is less colored by heating and contains less foreign materials (undissolved materials). The multilayer film of the present invention is, therefore, excellent in recyclability. There will be described a method for producing a monolayer film using a recovery of the multilayer film.

Another suitable embodiment of the present invention is a method for producing a monolayer film, comprising melt-kneading a recovery of a multilayer film of the present invention (hereinafter, "a recovery of a multilayer film of the present invention" is sometimes abbreviated as a "recovery") and then forming a film from the melt-kneaded product. Here, it is more preferable to melt-knead the recovery, a plasticizer, and a polyvinyl acetal (III) having an acetalization degree of 55 to 85 mol %, a content of a vinyl ester monomer unit of 0.1 to 15 mol % and a viscosity-average degree of polymerization of 1,400 to 5,000, followed by forming a film from the melt-kneaded product.

A viscosity-average degree of polymerization of the polyvinyl acetal (III) is 1,400 to 5,000, preferably 1,500 to 3,500. If the viscosity-average degree of polymerization is less than 1,400, strength of a monolayer film obtained is insufficient.

In contrast, if the polymerization degree is over 5,000, melt viscosity is too high to form a film.

An acetalization degree of the polyvinyl acetal (III) is 55 to 85 mol %. If the acetalization degree is less than 55 mol %, compatibility with a plasticizer and so on is deteriorated. Furthermore, foreign materials (undissolved materials) in a multilayer film obtained may increase. The acetalization degree is preferably 60 mol % or more, more preferably 65 mol % or more. In contrast, if the acetalization degree is more than 85 mol %, efficiency of the acetalization reaction is considerably reduced. Furthermore, a monolayer film obtained tends to be colored. The acetalization degree is preferably 80 mol % or less.

A content of a vinyl ester monomer unit of the polyvinyl acetal (III) is 0.1 to 15 mol %. If the content of a vinyl ester monomer unit is less than 0.1 mol %, a polyvinyl acetal cannot be stably produced, so that a film cannot be formed. The content of a vinyl ester monomer unit is preferably 0.7 mol % or more, more preferably 6 mol % or more, further preferably 7 mol % or more. In contrast, if the content of a vinyl ester monomer unit is more than 15 mol %, a multilayer film obtained is colored. The content of a vinyl ester monomer unit is preferably 13 mol % or less, more preferably 10 mol % or less.

A content of a vinyl alcohol monomer unit of the polyvinyl acetal (III) used in the present invention is preferably 5 to 44.9 mol %.

A content of monomer units other than an acetalized monomer unit, a vinyl ester monomer unit and a vinyl alcohol monomer unit in the polyvinyl acetal (III) of the present invention is preferably 20 mol % or less, more preferably 10 mol % or less, further preferably 5 mol % or less.

A polyvinyl acetal (III) used in the present invention is preferably produced as described as a method for producing a polyvinyl acetal (I) and a polyvinyl acetal (II).

Preferably, as a polyvinyl acetal (III), the polyvinyl acetal (I) and the polyvinyl acetal (II) described above is used. In the light of improving strength of a film, preferably a polyvinyl acetal (I) is used as a polyvinyl acetal (III).

Generally, a polyvinyl acetal is formed into a film using, for example, a film forming apparatus having an extruder equipped with a weigh machine such as a gear pump and a die such as a T-die. Generally, during film forming, both ends (trim) of the film are removed. Recovering and recycling such a trim is very important in the light of saving of energy, effective utilization of resources and yield improvement. Off-spec products generated in a process of producing a film having an uneven surface which cannot be used as a product and off-spec products with an uneven composition and/or thickness which cannot be used as a product, are also useful because they can be recycled as a trim. For a polyvinyl acetal (I) and a polyvinyl acetal (II) used in a multilayer film of the present invention, generation of coarse particles during acetalization reaction is inhibited, so that in melt film-forming of a polyvinyl acetal obtained, a film with less foreign materials (undissolved materials) can be obtained. Furthermore, since a multilayer film of the present invention is less colored during heating, a recovery such as the above trim and off-spec products can be effectively recycled.

A plasticizer which is newly added to the recovery can be selected from those which can be used for producing a layer (X) as described above. As the newly added plasticizer, any of the above plasticizers can be used as long as it gives a monolayer film with excellent transparency. If the amount of the recovery is more than 50 parts by mass based on 100 parts by mass of a newly added polyvinyl acetal (I), it is preferable that 10 parts by mass or more of the plasticizer added can be a hydroxy-containing aliphatic ester compound, a hydroxy-containing aliphatic ether compound, a hydroxy-containing aliphatic polyester compound, a monoether compound of a polyalkylene glycol with an aromatic alcohol, or a monoester compound of a polyalkylene glycol with an aromatic carboxylic acid.

There are no particular restrictions to a mass ratio of the newly added recovery to the polyvinyl acetal (III) and it can be arbitrarily changed. Generally, the amount of the recovery is 1 to 10000 parts by mass based on 100 parts by mass of the polyvinyl acetal (III).

A content of the plasticizer added to the recovery is, but not limited to, 20 to 100 parts by mass based on 100 parts by mass of the newly added polyvinyl acetal (III). If it is less than 20 parts by mass, impact resistance of a film obtained or a laminated glass produced using the film may be insufficient. In contrast, if it is more than 100 parts by mass, bleed-out of the plasticizer may occur, so that transparency of a film obtained may be deteriorated and adhesiveness to a glass may be impaired.

A melt kneading method and a film-forming method which are employed in a method for producing a monolayer from the recovery can be as described for production of a layer (X). The recovery can be re-input into an extruder by, for example, a method where a film as a trim or an off-spec product is wound into a roll and the roll is wound off and re-input in an extruder; or a method where a trim or an off-spec product is wound into a roll and the roll is cut into pieces with a certain size which are then re-input in an extruder.

In recycling a recovery such as a trim and an off-spec product as described above, the amounts of a polyvinyl acetal (III), a plasticizer and other components are adjusted, that is, while components in a newly obtained film are analyzed, the amount of each component input in an extruder can be adjusted, to give a desired film.

A thickness of a monolayer film obtained by the production method using a recovery is, but not limited to, preferably 0.05 to 5.0 mm, more preferably 0.1 to 2.0 mm, further preferably 0.1 to 1.2 mm.

An interlayer film for a laminated glass consisting of a monolayer film obtained by the production method using a recovery is also a suitable embodiment of the present invention. The monolayer film is less colored. Furthermore, since the monolayer film contains less foreign materials (undissolved materials), the monolayer film is excellent in transparency. Therefore, the monolayer film is useful as an interlayer film for a laminated glass. A laminated glass consisting of a plurality of glass sheets bonded via the interlayer film for a laminated glass is also a suitable embodiment of the present invention. The laminated glass can be produced by a method described as a method for producing a laminated glass using a multilayer film of the present invention as an interlayer film.

In a laminated glass thus obtained, a haze is preferably 1.0 or less. In the present invention, a haze of a laminated glass is measured in accordance with JIS K7105.

EXAMPLES

There will be further detailed the present invention with reference to Examples and Comparative Examples. In Examples and Comparative Examples below, unless otherwise indicated, "part(s)" and "%" is by mass. Here, "polymerization degree" means "viscosity-average degree of polymerization".

[Synthesis of Polyvinyl Acetate]
PVAc-1

In a 6 liter separable flask equipped with a stirrer, a thermometer, a nitrogen inlet tube and a reflux condenser were charged 2,555 g of pre-deoxidized vinyl acetate monomer (VAM) containing 500 ppm of acetaldehyde (AA) and 50 ppm of acetaldehyde dimethyl acetal (DMA); 945 g of methanol (MeOH) containing 50 ppm of acetaldehyde dimethyl acetal with an acetaldehyde content being less than 1 ppm; a 1% solution of tartaric acid in methanol in such an amount that a content of tartaric acid in vinyl acetate monomer was to be 20 ppm. While nitrogen is blown into the flask, an internal temperature of the flask was adjusted to 60° C. Here, in the reflux condenser, an aqueous ethylene glycol solution at −10° C. was circulated. A 0.55% by mass solution of di-n-propyl peroxydicarbonate in methanol was prepared, and 18.6 mL of the solution was added to the flask, to initiate polymerization. Here, the amount of di-n-propyl peroxydicarbonate was 0.081 g. The solution of di-n-propyl peroxydicarbonate in methanol was successively added at a rate of 20.9 mL/hr until the polymerization was completed. During the polymerization, an internal temperature of the flask was kept at 60° C. Four hours after the initiation of the polymerization, that is, at the time when a solid concentration of the polymerization solution reached 25.1%, 1,200 g of methanol containing 0.0141 g of sorbic acid (corresponding to 3 molar equivalents of the remaining undecomposed di-n-propyl peroxydicarbonate in the polymerization solution), and then the polymerization solution was cooled to terminate the polymerization. At the end of the polymerization, a polymerization degree of vinyl acetate monomer was 35.0%. The polymerization solution was cooled to room temperature and then the inside of the flask was vacuumed using a tap aspirator to evaporate vinyl acetate monomer and methanol, resulting in precipitation of polyvinyl acetate. To the precipitated polyvinyl acetate was added 3,000 g of methanol, and the mixture was heated at 30° C. to dissolve polyvinyl acetate. Again, the inside of the flask was vacuumed using a tap aspirator to evaporate vinyl acetate monomer and methanol, resulting in precipitation of polyvinyl acetate. The procedure of dissolving the polyvinyl acetate in methanol and precipitating it was repeated two more times.

Methanol was added to the precipitated polyvinyl acetate to provide a 40% by mass of methanol solution of polyvinyl acetate (PVAc-1), having a 99.8% of removal rate of vinyl acetate monomer.

Using a part of the solution of PVAc-1 in methanol thus obtained, a polymerization degree was measured. To the solution of PVAc-1 in methanol was added a 10% solution of sodium hydroxide in methanol in such an amount that a molar ratio of sodium hydroxide to a vinyl acetate unit in the polyvinyl acetate was to be 0.1. At the time when a gelled substance was formed, the gel was crushed and soxhlet-extracted into methanol for 3 days. The polyvinyl alcohol obtained was dried and subjected to measurement of a viscosity-average degree of polymerization. A polymerization degree was 1,700.

PVAc-2 to PVAc-12

Polyvinyl acetates (PVAc-2 to PVAc-12) were produced as described for PVAc-1, except the reaction was conducted under the conditions described in Table 1. In Table 1, "ND" means less than 1 ppm. A polymerization degree of each polyvinyl acetate obtained was determined as described for PVAc-1 The results are shown in Table 1.

TABLE 1

| Synthetic Examples | VAM (g) | MeOH (g) | Impurities in VAM | | Impurities in MeOH | | Initiator[1] | | | Polymerization time (hr) | Solid concentration (%) | Polymerization rate (%) | Polymerization degree |
|---|---|---|---|---|---|---|---|---|---|---|---|---|---|
| | | | AA (ppm) | DMA (ppm) | AA (ppm) | DMA (ppm) | Concentration (g/L) | Initial (mL) | Successive (mL/hr) | | | | |
| PVAc-1 | 2555 | 945 | 500 | 50 | ND | 50 | 0.55 | 18.6 | 20.9 | 4.0 | 25.1 | 35.0 | 1700 |
| PVAc-2 | 2800 | 700 | 150 | 15 | ND | 50 | 0.30 | 10.2 | 11.5 | 4.0 | 15.8 | 20.0 | 2400 |
| PVAc-3 | 3164 | 336 | 100 | 10 | ND | 50 | 0.30 | 9.5 | 10.7 | 2.0 | 9.0 | 10.0 | 3600 |
| PVAc-4 | 2555 | 945 | 10 | 2 | ND | 5 | 0.20 | 51.1 | 57.4 | 4.0 | 24.3 | 35.0 | 1700 |
| PVAc-5 | 2590 | 910 | 950 | 50 | ND | 100 | 0.80 | 13.0 | 14.6 | 4.0 | 25.6 | 35.0 | 1700 |
| PVAc-6 | 2520 | 980 | ND | ND | ND | ND | 0.50 | 20.2 | 22.7 | 4.0 | 24.7 | 35.0 | 1700 |
| PVAc-7 | 2660 | 840 | 1500 | 100 | 150 | 20 | 0.80 | 13.3 | 14.9 | 4.0 | 26.3 | 35.0 | 1700 |
| PVAc-8 | 2800 | 700 | ND | ND | ND | ND | 0.10 | 20.5 | 23.0 | 4.0 | 15.7 | 20.0 | 2400 |
| PVAc-9 | 2958 | 542 | 1500 | 100 | 100 | 15 | 0.20 | 14.8 | 16.6 | 4.0 | 16.7 | 20.0 | 2400 |
| PVAc-10 | 3150 | 350 | ND | ND | ND | ND | 0.30 | 9.5 | 10.6 | 2.0 | 9.0 | 10.0 | 3600 |
| PVAc-11 | 3325 | 175 | 1300 | 120 | 100 | 15 | 0.30 | 8.0 | 9.0 | 2.0 | 8.5 | 9.0 | 3600 |
| PVAc-12 | 2293 | 1207 | 10 | 2 | ND | 5 | 0.10 | 11.0 | 12.4 | 2.0 | 3.3 | 5.0 | 1700 |

[1]Initiator: a solution of di-n-propyl peroxydicarbonate in MeOH
[2]Polymerization temperature: 50° C.

[Synthesis of Polyvinyl Alcohol]
PVA-1

To a 40% by mass solution of PVAc-1 polyvinyl acetate in methanol were added methanol in such an amount that a total solid concentration (saponification concentration) was to be 30% by mass and a 8% solution of sodium hydroxide in methanol in such an amount that a molar ratio of sodium hydroxide to a vinyl acetate monomer unit in the polyvinyl acetate was to be 0.020 with stirring, and a saponification reaction was initiated at 40° C. At the time when a gelled substance was formed with progress of the saponification reaction, the gel was crushed. The crushed gel was transferred into a vessel at 40° C. and after the lapse of 60 min from the initiation of the saponification reaction, was immersed in a solution of methanol/methyl acetate/water (25/70/5 by mass) for neutralization. The swollen gel obtained was collected by centrifugation and a two-fold amount of methanol to the mass of the swollen gel was added for immersion. After standing the mixture for 30 min, it was centrifuged. This procedure was repeated four times. The product was dried at 60°C. for one hour and at 100° C. for 2 hours to afford PVA-1.

A polymerization degree and a saponification degree of PVA-1 were determined in accordance with the method described in JIS-K6726. A polymerization degree was 1,700, and a saponification degree was 99.1 mol %. These physical data are also shown in Table 2.

After ashing PVA-1, the amount of sodium in the ash obtained was measured by an ICP emission spectrometer "IRIS AP" from Jarrell Ash Corporation to determine a content of sodium acetate in PVA-1. A content of sodium acetate was 0.7% (0.20% in terms of sodium). These physical data are also shown in Table 2.

PVA-2 to 5, Comparative PVA-1 to 3

Each PVA was synthesized as described for PVA-1, except that the reaction was conducted under the conditions shown in Table 2. A polymerization degree, a saponification degree and a content of sodium acetate (converted to the mass of sodium) of the PVA obtained were determined as described for PVA-1. The results are shown in Table 2.

TABLE 2

| Synthetic Examples | PVAc[1] | Saponification | | Washing[2] | | Polymerization degree | Saponification degree (mol %) | Na (%) |
|---|---|---|---|---|---|---|---|---|
| | | Saponification concentration (%) | NaOH (molar ratio) | Amount of MeOH | Number | | | |
| PVA-1 | PVAc-1 | 30 | 0.020 | 2 | 4 | 1700 | 99.1 | 0.20 |
| PVA-2 | PVAc-4 | 30 | 0.020 | 2 | 4 | 1700 | 99.1 | 0.11 |
| PVA-3 | PVAc-5 | 30 | 0.020 | 1.5 | 3 | 1700 | 99.1 | 0.31 |
| PVA-4 | PVAc-12 | 30 | 0.020 | 2 | 4 | 1700 | 99.1 | 0.20 |
| PVA-5 | PVAc-1 | 30 | 0.020 | 1.4 | 3 | 1700 | 99.1 | 0.39 |
| Comparative PVA-1 | PVAc-6 | 30 | 0.020 | 2 | 4 | 1700 | 99.2 | 0.20 |
| Comparative PVA-2 | PVAc-7 | 30 | 0.020 | 2 | 4 | 1700 | 99.1 | 0.17 |
| Comparative PVA-3 | PVAc-1 | 30 | 0.020 | 1 | 2 | 1700 | 99.2 | 0.56 |

[1] A value in parentheses is a mixing mass ratio of PVAc.
[2] The amount of MeOH used for washing a swollen gel after neutralization (a mass ratio of MeOH to a swollen gel) and the number of washing PVA-6, Comparative PVA-4 and 5

Each PVA was synthesized as described for PVA-1, except that the reaction was conducted under the conditions shown in Table 3. A polymerization degree, a saponification degree and a content of sodium acetate (converted to the mass of sodium) of the PVA obtained were determined as described for PVA-1. The results are shown in Table 3.

TABLE 3

| Synthetic Examples | PVAc[1] | Saponification | | Washing[2] | | Polymerization degree | Saponification degree (mol %) | Na (%) |
|---|---|---|---|---|---|---|---|---|
| | | Saponification concentration (%) | NaOH (molar ratio) | Amount of MeOH | Number | | | |
| PVA-6 | PVAc-2 | 25 | 0.018 | 2 | 4 | 2400 | 98.7 | 0.14 |
| Comparative PVA-4 | PVAc-8 | 25 | 0.018 | 2 | 4 | 2400 | 98.3 | 0.11 |
| Comparative PVA-5 | PVAc-9 | 25 | 0.018 | 2 | 4 | 2400 | 98.3 | 0.22 |

[1] A value in parentheses is a mixing mass ratio of PVAc.
[2] The amount of MeOH used for washing a swollen gel after neutralization (a mass ratio of MeOH to a swollen gel) and the number of washing PVA-7, Comparative PVA-6 and 7

Each PVA was synthesized as described for PVA-1, except that the reaction was conducted under the conditions shown in Table 4. A polymerization degree, a saponification degree and a content of sodium acetate (converted to the mass of sodium) of the PVA obtained were determined as described for PVA-1. The results are shown in Table 4.

TABLE 4

| Synthetic Examples | PVAc[1] | Saponification | | Washing[2] | | Polymerization degree | Saponification degree (mol %) | Na (%) |
|---|---|---|---|---|---|---|---|---|
| | | Saponification concentration (%) | NaOH (molar ratio) | Amount of MeOH | Number | | | |
| PVA-7 | PVAc-3 | 15 | 0.015 | 2 | 4 | 3600 | 98.5 | 0.17 |
| Comparative PVA-6 | PVAc-10 | 15 | 0.015 | 2 | 4 | 3600 | 98.3 | 0.11 |

TABLE 4-continued

| Synthetic Examples | PVAc[1] | Saponification | | Washing[2] | | Polymerization degree | Saponification degree (mol %) | Na (%) |
|---|---|---|---|---|---|---|---|---|
| | | Saponification concentration (%) | NaOH (molar ratio) | Amount of MeOH | Number | | | |
| Comparative PVA-7 | PVAc-11 | 15 | 0.015 | 2 | 4 | 3600 | 98.3 | 0.22 |

[1] A value in parentheses is a mixing mass ratio of PVAc.
[2] The amount of MeOH used for washing a swollen gel after neutralization (a mass ratio of MeOH to a swollen gel) and the number of washing PVA-8 to 11, Comparative PVA-8 and 9

Each PVA was synthesized as described for PVA-1, except that the reaction was conducted under the conditions shown in Table 5. A polymerization degree, a saponification degree and a content of sodium acetate (converted to the mass of sodium) of the PVA obtained were determined as described for PVA-1. The results are shown in Table 5.

TABLE 5

| Synthetic Examples | PVAc[1] | Saponification | | Washing[2] | | Polymerization degree | Saponification degree (mol %) | Na (%) |
|---|---|---|---|---|---|---|---|---|
| | | Saponification concentration (%) | NaOH (molar ratio) | Amount of MeOH | Number | | | |
| PVA-8 | PVAc-1 | 30 | 0.008 | 2 | 3 | 1700 | 88.2 | 0.20 |
| PV4-9 | PVAc-4 | 30 | 0.008 | 2 | 3 | 1700 | 88.1 | 0.11 |
| PVA-10 | PVAc-5 | 30 | 0.008 | 2 | 3 | 1700 | 88.3 | 0.14 |
| PVA-11 | PVAc-12 | 30 | 0.008 | 2 | 3 | 1700 | 87.8 | 0.20 |
| Comparative PVA-8 | PVAc-6 | 30 | 0.008 | 2 | 3 | 1700 | 88.2 | 0.14 |
| Comparative PVA-9 | PVAc-7 | 30 | 0.008 | 2 | 3 | 1700 | 88.1 | 0.14 |

[1] A value in parentheses is a mixing mass ratio of PVAc.
[2] The amount of MeOH used for washing a swollen gel after neutralization (a mass ratio of MeOH to a swollen gel) and the number of washing PVA-12, Comparative PVA-10 and 11

Each PVA was synthesized as described for PVA-1, except that the reaction was conducted under the conditions shown in Table 6. A polymerization degree, a saponification degree and a content of sodium acetate (converted to the mass of sodium) of the PVA obtained were determined as described for PVA-1. The results are shown in Table 6.

TABLE 6

| Synthetic Examples | PVAc[1] | Saponification | | Washing[2] | | Polymerization degree | Saponification degree (mol %) | Na (%) |
|---|---|---|---|---|---|---|---|---|
| | | Saponification concentration (%) | NaOH (molar ratio) | Amount of MeOH | Number | | | |
| PVA-12 | PVAc-2 | 25 | 0.007 | 2 | 3 | 2400 | 88.3 | 0.25 |
| Comparative PVA-10 | PVAc-8 | 25 | 0.007 | 2 | 3 | 2400 | 88.2 | 0.17 |
| Comparative PVA-11 | PVAc-9 | 25 | 0.007 | 2 | 3 | 2400 | 88.3 | 0.17 |

[1] A value in parentheses is a mixing mass ratio of PVAc.
[2] The amount of MeOH used for washing a swollen gel after neutralization (a mass ratio of MeOH to a swollen gel) and the number of washing PVA-13, Comparative PVA-12 and 13

Each PVA was synthesized as described for PVA-1, except that the reaction was conducted under the conditions shown in Table 7. A polymerization degree, a saponification degree and a content of sodium acetate (converted to the mass of sodium) of the PVA obtained were determined as described for PVA-1. The results are shown in Table 7.

TABLE 7

| Synthetic Examples | PVAc[1] | Saponification concentration (%) | NaOH (molar ratio) | Washing[2] Amount of MeOH | Number | Polymerization degree | Saponification degree (mol %) | Na (%) |
|---|---|---|---|---|---|---|---|---|
| PVA-13 | PVAc-3 | 15 | 0.006 | 2 | 3 | 3600 | 87.8 | 0.11 |
| Comparative PVA-12 | PVAc-10 | 15 | 0.006 | 2 | 3 | 3600 | 87.9 | 0.11 |
| Comparative PVA-13 | PVAc-11 | 15 | 0.006 | 2 | 3 | 3600 | 88.0 | 0.22 |

[1]A value in parentheses is a mixing mass ratio of PVAc.
[2]The amount of MeOH used for washing a swollen gel after neutralization (a mass ratio of MeOH to a swollen gel) and the number of washing

[Synthesis of PVB]
PVB-1

In a 10 liter glass vessel equipped with a reflux condenser, a thermometer and an anchor type impeller were charged 8,100 g of ion-exchanged water and 660 g of PVA-1 (PVA concentration: 7.5%), and the content was warmed to 95° C. to completely dissolve the PVA. Then, the content was gradually cooled to 10° C. over about 30 min with stirring at 120 rpm. Then, to the vessel were added 384 g of n-butylaldehyde and 540 mL of 20% hydrochloric acid, to carry out a butyralation reaction for 150 min. Then, the mixture was heated to 60° C. over 60 min, kept at 60° C. for 120 min, and then cooled to room temperature. The precipitated resin was washed with ion-exchanged water, followed by adding an excessive aqueous solution of sodium hydroxide for neutralization. Subsequently, the resin was again washed with ion-exchanged water and then dried to provide PVB-1.

[Composition of PVB]

A butyralation degree (acetalization degree), a content of a vinyl acetate monomer unit and a content of a vinyl alcohol monomer unit of PVB-1 were determined in accordance with JIS K6728. A butyralation degree (acetalization degree) was 68.2 mol %, a content of a vinyl acetate monomer unit was 0.9 mol %, and a content of a vinyl alcohol monomer unit was 30.9 mol %. The results are also shown in Table 8.

PVB-2 to 5

PVBs were synthesized and evaluated as described for PVB-1, except that a starting PVA was changed as shown in Table 8. The results are shown in Table 8.

PVB-6

A PVB was synthesized and evaluated as described for PVB-1, except that the amount of n-butylaldehyde was changed to 320 g. The results are shown in Table 8.

PVB-7

A PVB was synthesized and evaluated as described for PVB-1, except that the amount of n-butylaldehyde was changed to 362 g. The results are shown in Table 8.

PVB-8

A polyvinyl butyral was synthesized and evaluated as described for PVB-1, except that the amount of n-butylaldehyde was changed to 449 g. The results are shown in Table 8.

Comparative PVB-1 to 3

Polyvinyl butyrals were synthesized and evaluated as described for PVB-1, except that a starting PVA was changed as shown in Table 8. The results are shown in Table 8.

Comparative PVB-4

A polyvinyl butyral was synthesized and evaluated as described for PVB-6, except that a starting PVA was changed to Comparative PVA-1. The results are shown in Table 8.

Comparative PVB-5

A polyvinyl butyral was synthesized and evaluated as described for PVB-8, except that a starting PVA was changed to Comparative PVA-1. The results are shown in Table 8.

Comparative PVB-6

A polyvinyl butyral was synthesized and evaluated as described for PVB-6, except that a starting PVA was changed to Comparative PVA-2. The results are shown in Table 8.

Comparative PVB-7

A polyvinyl butyral was synthesized and evaluated as described for PVB-8, except that a starting PVA was changed to Comparative PVA-2. The results are shown in Table 8.

TABLE 8

| PVB No. | PVA used | Polymerization degree | Acetalization degree (mol %) | Vinyl acetate unit (mol %) | Vinyl alcohol unit (mol %) |
|---|---|---|---|---|---|
| PVB-1 | PVA-1 | 1700 | 68.2 | 0.9 | 30.9 |
| PVB-2 | PVA-2 | 1700 | 68.2 | 0.9 | 30.9 |
| PVB-3 | PVA-3 | 1700 | 68.4 | 0.9 | 30.7 |
| PVB-4 | PVA-4 | 1700 | 68.6 | 0.9 | 30.5 |
| PVB-5 | PVA-5 | 1700 | 68.5 | 0.9 | 30.6 |
| PVB-6 | PVA-1 | 1700 | 56.8 | 0.9 | 42.3 |
| PVB-7 | PVA-1 | 1700 | 64.3 | 0.9 | 34.8 |
| PVB-8 | PVA-1 | 1700 | 79.8 | 0.9 | 19.3 |
| Comparative PVB-1 | Comparative PVA-1 | 1700 | 68.2 | 0.8 | 31.0 |
| Comparative PVB-2 | Comparative PVA-2 | 1700 | 68.4 | 0.9 | 30.7 |
| Comparative PVB-3 | Comparative PVA-3 | 1700 | 68.3 | 0.8 | 30.9 |
| Comparative PVB-4 | Comparative PVA-1 | 1700 | 56.8 | 0.8 | 42.4 |
| Comparative PVB-5 | Comparative PVA-1 | 1700 | 79.8 | 0.8 | 19.4 |
| Comparative PVB-6 | Comparative PVA-2 | 1700 | 56.6 | 0.8 | 42.6 |
| Comparative PVB-7 | Comparative PVA-2 | 1700 | 79.6 | 0.8 | 19.6 |

PVB-9

In a 10 liter glass vessel equipped with a reflux condenser, a thermometer and an anchor type impeller were charged 8,234 g of ion-exchanged water and 526 g of PVA-6 (PVA concentration: 6.0%), and the content was warmed to 95° C. for complete dissolution. Then, the content was gradually cooled to 15° C. over about 30 min with stirring at 120 rpm. Then, to the vessel were added 307 g of n-butylaldehyde and 540 mL of 20% hydrochloric acid, to carry out a butyralation reaction for 120 min. Then, the mixture was heated to 60° C. over 60 min, kept at 60° C. for 120 min, and then cooled to room temperature. The precipitated resin was washed with ion-exchanged water, followed by adding an excessive aqueous solution of sodium hydroxide for neutralization. Subsequently, the resin was again washed with ion-exchanged water and dried to provide a polyvinyl butyral.

The composition of the polyvinyl butyral obtained was determined as described for PVB-1. A butyralation degree (acetalization degree) was 68.2 mol %, a content of a vinyl acetate monomer unit was 1.3 mol %, and a content of a vinyl alcohol monomer unit was 30.5 mol %. Then, the PVB-9 obtained was analyzed by GPC as described for PVB-1. The results are shown in Table 9.

Comparative PVB-8 and 9

PVBs were synthesized and evaluated as described for PVB-9, except that a starting PVA was changed as shown in Table 9. The results are shown in Table 9.

TABLE 9

| PVB No. | PVA used | Polymerization degree | Acetalization degree (mol %) | Vinyl acetate unit (mol %) | Vinyl alcohol unit (mol %) |
|---|---|---|---|---|---|
| PVB-9 | PVA-6 | 2400 | 68.2 | 1.3 | 30.5 |
| Comparative PVB-8 | Comparative PVA-4 | 2400 | 68.2 | 1.7 | 30.1 |
| Comparative PVB-9 | Comparative PVA-5 | 2400 | 68.3 | 1.7 | 30.0 |

PVB-10

In a 10 liter glass vessel equipped with a reflux condenser, a thermometer and an anchor type impeller were charged 8,322 g of ion-exchanged water and 438 g of PVA-7 (PVA concentration: 5.0%), and the content was warmed to 95° C. to completely dissolve the PVA. Then, the content was gradually cooled to 20° C. over about 30 min with stirring at 120 rpm. Then, to the vessel were added 256 g of n-butylaldehyde and 540 mL of 20% hydrochloric acid, to carry out a butyralation reaction for 120 min. Then, the mixture was heated to 60° C. over 60 min, kept at 60° C. for 120 min, and then cooled to room temperature. The precipitated resin was washed with ion-exchanged water, followed by adding an excessive aqueous solution of sodium hydroxide for neutralization. Subsequently, the resin was again washed with ion-exchanged water and dried to provide a PVB.

The composition of the PVB obtained was determined as described for PVB-1. A butyralation degree (acetalization degree) was 68.1 mol %, a content of a vinyl acetate monomer unit was 1.5 mol %, and a content of a vinyl alcohol monomer unit was 30.4 mol %. Then, the PVB-10 obtained was analyzed by GPC as described for PVB-1. The results are shown in Table 10.

Comparative PVB-10 and 11

PVBs were synthesized and evaluated as described for PVB-10, except that a starting PVA was changed as shown in Table 10. The results are shown in Table 10.

TABLE 10

| PVB No. | PVA used | Polymerization degree | Acetalization degree (mol %) | Vinyl acetate unit (mol %) | Vinyl alcohol unit (mol %) |
|---|---|---|---|---|---|
| PVB-10 | PVA-7 | 3600 | 68.1 | 1.5 | 30.4 |
| Comparative PVB-10 | Comparative PVA-6 | 3600 | 68.3 | 1.7 | 30.0 |

TABLE 10-continued

| PVB No. | PVA used | Polymerization degree | Acetalization degree (mol %) | Vinyl acetate unit (mol %) | Vinyl alcohol unit (mol %) |
|---|---|---|---|---|---|
| Comparative PVB-11 | Comparative PVA-7 | 3600 | 68.4 | 1.7 | 29.9 |

PVB-11

In a 10 liter glass vessel equipped with a reflux condenser, a thermometer and an anchor type impeller were charged 8,100 g of ion-exchanged water and 660 g of PVA-8 (PVA concentration: 7.5%), and the content was warmed to 95° C. for complete dissolution. Then, the content was gradually cooled to 15° C. over about 30 min with stirring at 120 rpm. Then, to the vessel were added 432 g of n-butylaldehyde and 540 mL of 20% hydrochloric acid, to carry out a butyralation reaction for 90 min. Then, the mixture was heated to 45° C. over 30 min, kept at 45° C. for 180 min, and then cooled to room temperature. The precipitated resin was washed with ion-exchanged water, followed by adding an excessive aqueous solution of sodium hydroxide for neutralization. Subsequently, the resin was again washed with ion-exchanged water and dried to provide a PVB.

The composition of the PVB obtained was determined as described for PVB-1. A butyralation degree (acetalization degree) was 74.1 mol %, a content of a vinyl acetate monomer unit was 8.1 mol %, and a content of a vinyl alcohol monomer unit was 17.8 mol %. Then, the PVB-11 obtained was analyzed by GPC as described for PVB-1. The results are shown in Table 11.

PVB-12 to 14

PVBs were synthesized and evaluated as described for PVB-11, except that a starting PVA was changed as shown in Table 11. The results are shown in Table 11.

PVB-15

A PVB was synthesized and evaluated as described for PVB-11, except that the amount of n-butylaldehyde was changed to 458 g. The results are shown in Table 11.

Comparative PVB-12 and 13

PVBs were synthesized and evaluated as described for PVB-11, except that a starting PVA was changed as shown in Table 11. The results are shown in Table 11.

Comparative PVB-14 and 15

PVBs were synthesized and evaluated as described for PVB-15, except that a starting PVA was changed as shown in Table 11. The results are shown in Table 11.

TABLE 11

| PVB No. | PVA used | Polymerization degree | Acetalization degree (mol %) | Vinyl acetate unit (mol %) | Vinyl alcohol unit (mol %) |
|---|---|---|---|---|---|
| PVB-11 | PVA-8 | 1700 | 74.1 | 8.1 | 17.8 |
| PVB-12 | PVA-9 | 1700 | 74.3 | 8.0 | 17.7 |
| PVB-13 | PVA-10 | 1700 | 74.2 | 7.9 | 17.9 |
| PVB-14 | PVA-11 | 1700 | 74.2 | 8.0 | 17.8 |
| PVB-15 | PVA-8 | 1700 | 78.5 | 7.5 | 14.0 |
| Comparative PVB-12 | Comparative PVA-8 | 1700 | 74.1 | 8.2 | 17.7 |
| Comparative PVB-13 | Comparative PVA-9 | 1700 | 74.3 | 8.0 | 17.7 |
| Comparative PVB-14 | Comparative PVA-8 | 1700 | 78.6 | 7.4 | 14.0 |
| Comparative PVB-15 | Comparative PVA-9 | 1700 | 78.6 | 7.4 | 14.0 |

PVB-16

In a 10 liter glass vessel equipped with a reflux condenser, a thermometer and an anchor type impeller were charged 8.234 g of ion-exchanged water and 526 g of PVA-12 (PVA concentration: 6.0%), and the content was warmed to 95° C. to completely dissolve the PVA. Then, the content was gradually cooled to 15° C. over about 60 min with stirring at 120 rpm. Then, to the vessel were added 344 g of n-butylaldehyde and 540 mL of 20% hydrochloric acid, to carry out a butyralation reaction for 90 min. Then, the mixture was heated to 45° C. over 30 min, kept at 45° C. for 180 min, and then cooled to room temperature. The precipitated resin was washed with ion-exchanged water, followed by adding an excessive aqueous solution of sodium hydroxide for neutralization. Subsequently, the resin was again washed with ion-exchanged water and dried to provide a PVB.

The composition of the PVB obtained was determined as described for PVB-1. A butyralation degree (acetalization degree) was 74.6 mol %, a content of a vinyl acetate monomer unit was 8.3 mol %, and a content of a vinyl alcohol monomer unit was 17.1 mol %. Then, the PVB-16 obtained was analyzed by GPC as described for PVB-1. The results are shown in Table 12.

Comparative PVB-16 and 17

PVBs were synthesized and evaluated as described for PVB-16, except that a starting PVA was changed as shown in Table 12. The results are shown in Table 12.

TABLE 12

| PVB No. | PVA used | Polymerization degree | Acetalization degree (mol %) | Vinyl acetate unit (mol %) | Vinyl alcohol unit (mol %) |
|---|---|---|---|---|---|
| PVB-16 | PVA-12 | 2400 | 74.6 | 8.3 | 17.1 |
| Comparative PVB-16 | Comparative PVA-10 | 2400 | 74.6 | 8.2 | 17.2 |
| Comparative PVB-17 | Comparative PVA-11 | 2400 | 74.5 | 8.1 | 17.4 |

PVB-17

In a 10 liter glass vessel equipped with a reflux condenser, a thermometer and an anchor type impeller were charged 8,234 g of ion-exchanged water and 438 g of PVA-13 (PVA concentration: 5.0%), and the content was warmed to 95° C. to completely dissolve the PVA. Then, the content was gradually cooled to 15° C. over about 60 min with stirring at 120 rpm. Then, to the vessel were added 265 g of n-butylaldehyde and 540 mL of 20% hydrochloric acid, to carry out a butyralation reaction for 90 min. Then, the mixture was heated to 45° C. over 30 min, kept at 45° C. for 180 min, and then cooled to room temperature. The precipitated resin was washed with ion-exchanged water, followed by adding an excessive aqueous solution of sodium hydroxide for neutralization. Subsequently, the resin was again washed with ion-exchanged water and dried to provide a PVB.

The composition of the PVB obtained was determined as described for PVB-1. For the PVB, a butyralation degree (acetalization degree) was 73.2 mol %, a content of a vinyl acetate monomer unit was 8.1 mol %, and a content of a vinyl alcohol monomer unit was 18.7 mol %. Then, the PVB-17 obtained was analyzed by GPC as described for PVB-1. The results are shown in Table 13.

Comparative PVB-18 and 19

PVBs were synthesized and evaluated as described for PVB-17, except that a starting PVA was changed as shown in Table 13. The results are shown in Table 13.

TABLE 13

| PVB No. | PVA used | Polymerization degree | Acetalization degree (mol %) | Vinyl acetate unit (mol %) | Vinyl alcohol unit (mol %) |
|---|---|---|---|---|---|
| PVB-17 | PVA-13 | 3600 | 73.2 | 8.1 | 18.7 |
| Comparative PVB-18 | Comparative PVA-12 | 3600 | 73.8 | 7.9 | 18.3 |
| Comparative PVB-19 | Comparative PVA-13 | 3600 | 73.6 | 8.2 | 18.2 |

Example 1

[Production of a Layer (X)]

Using Labo Plastomill "Model C" from Toyo Seiki Seisaku-Sho, Ltd., 50 parts by mass of synthetic powdery PVB-1 and 19 parts by mass of triethyleneglycol-di-2-ethyl hexanoate as a plasticizer were melt-kneaded at 170° C. and 50 rpm for 5 min. Throughout the melt kneading, nitrogen (100 mL/min) was blown into the vessel. During the melt kneading, fuming from the starting mixture was not observed. The kneaded mixture thus obtained was hot-pressed at 150° C. and 5 MPa for 30 min, to produce a film with a thickness of 320 μm.

[Production of a Layer (Y)]

Using the above Labo Plastomill, 43 parts by mass of the synthetic powdery PVB-11 and 26 parts by mass of triethyleneglycol-di-2-ethyl hexanoate as a plasticizer were melt-kneaded at 170° C. and 50 rpm for 5 min. Throughout the melt kneading, nitrogen (100 mL/min) was blown into the vessel. The kneaded mixture thus obtained was hot-pressed at 150° C. and 5 MPa for 30 min, to produce a film with a thickness of 120 μm.

[Production of a Laminate Film]

The layer (X) and the layer (Y) were piled in the order of layer (X)/layer (Y)/layer (X), which was pressed under the conditions of 135° C. and 10 kg/cm² in a mold form with a thickness of 760 μm, to afford a laminate film having the configuration of layer (X)(320 μm)/layer (Y)(120 μm)/layer (X)(320 μm).

[GPC Measurement]

(Measuring Apparatus)

GPC measurement was conducted using "GPC max" from VISCOTECH Co. Ltd. A differential refractive index detector was "TDA305" from VISCOTECH Co. Ltd. An ultraviolet-visible absorptiometer was "UV Detector 2600" from VISCOTECH Co. Ltd. An optical path length of a detection cell in the absorptiometer was 10 mm. A GPC column was "GPC HFIP-806M" from Showa Denko K. K. An analysis software was OmniSEC (Version 4.7.0.406) attached to the apparatus.

(Measurement Conditions)

A mobile phase was HFIP with 20 mmol/L sodium trifluoroacetate. A flow rate of the mobile phase was 1.0 mL/min. In the measurement, a sample injection volume was 100 μL and a GPC column temperature was 40° C.

For a sample with a PVA viscosity-average degree of polymerization of more than 2,400, GPC measurement was conducted using an appropriately diluted sample (100 μL). From an observed value, an absorbance at a sample concentration of 1.00 mg/mL was calculated by the following formula. "α" (mg/mL) is a concentration of the diluted sample.

Absorbance at a sample concentration of 1.00 mg/mL=(1.00/α)×a measured absorbance (Preparation of a Calibration Curve)

GPC measurement was conducted for monodisperse PMMAs (peak-top molecular weight: 1944000, 790000, 467400, 271400, 144000, 79250, 35300, 13300, 7100, 1960, 1020, 690) from Agilent Technologies as standards to prepare calibration curves for converting an elution volume into a PMMA molecular weight for a differential refractive index detector and an absorptiometer, respectively. For preparing each calibration curve, the above analysis software was used. In measurement of a PMMA in this measurement, a column capable of separating the peaks of standard samples with a molecular weight of 1,944,000 and 271,400, respectively, was used.

In this apparatus, a signal strength obtained from a differential refractive index detector is expressed in millivolt unit, and a signal strength obtained from an absorptiometer is expressed in an absorbance (abs unit: absorbance unit).

(Sample Preparation)

The multilayer film obtained was heated by hot-pressing at a pressure of 2 MPa and 230° C. for 3 hours and then cooled to provide a heat-treated film. A piece obtained by cutting the film perpendicular to the film surface from its center was used as a sample.

(Measurement)

The sample thus prepared was dissolved in HFIP with 20 mmol/L sodium trifluoroacetate, to prepare a solution of the sample (concentration: 1.00 mg/mL). The solution was filtrated through 0.45 μm polytetrafluoroethylene filter and than subjected to GPC measurement. A chromatogram prepared by plotting a signal strength measured by a differential refractive index detector to a molecular weight converted from an elution volume in this GPC (PMMA-converted molecular weight) was prepared, and a peak-top molecular weight (A) and a signal strength (a) at a peak-top molecular weight (A) were determined. Furthermore, a chromatogram prepared by plotting a signal strength (absorbance) measured by an absorptiometer (measuring wavelength: 280 nm) to a molecular weight (PMMA-converted molecular weight) was prepared, and a peak-top molecular weight (B) and a signal strength (absorbance, b) at a peak-top molecular weight (B) were determined.

A peak-top molecular weight (A) and a peak-top molecular weight (B) obtained were substituted into the following formula:

$(A-B)/A$, to give a value of 0.51. The results are also shown in Table 14.

A peak-top molecular weight (C) and a signal strength (absorbance, c) at the peak-top molecular weight (C) were determined as described for determining a peak-top molecular weight (B) and a signal strength (absorbance, b), respectively, except that a measuring wavelength was changed to 320 nm. A peak-top molecular weight (A) and a peak-top molecular weight (C) were substituted into the following formula:

$(A-C)/A$, to give a value of 0.52. The results are also shown in Table 14.

A monodisperse PMMA was "PMMA85K" (weight-average molecular weight: 85450, number average molecular weight: 74300, intrinsic viscosity: 0.309) from American Polymer Standard Corp. GPC measurement of the PMMA was conducted as described for the above method, except that a sample was changed to the above PMMA. A signal strength (x) at a peak-top molecular weight measured by a differential refractive index detector as determined by the method described for determining a peak-top molecular weight (A) was 390.82 mV. Furthermore, a signal strength (absorbance, y) at a peak-top molecular weight measured by an absorptiometer (220 nm) as determined by the method for determining a peak-top molecular weight (B) was 269.28 mV (0.26928 absorbance unit).

A signal strength (a), a peak-top molecular weight (b), a signal strength (x) and a signal strength (y) were substituted into the following formula:

$(b/y)/(a/x)$, to give a value of $2.56 \times 10^{-2}$. The results are also shown in Table 14.

A signal strength (a), a peak-top molecular weight (c), a signal strength (x) and a signal strength (y) were substituted into the following formula:

$(c/y)/(a/x)$, to give a value of $1.45 \times 10^{-2}$. The results are also shown in Table 14.

[Undissolved Materials in a Film]

The laminated film obtained was sandwiched between two glass sheets (20 cm×20 cm), and passed through a press roll at 110° C. for preliminary bonding while the air between the glass sheets and the film was expelled. The laminate after preliminary bonding was left in an autoclave at 135° C. and 1.2 MPa for 30 min, to produce a laminated glass (total: 20 sheets). Foreign materials in the laminated glass obtained were counted by visual observation using a magnifier. The total number of the foreign materials in twenty sheets of the laminated glasses was counted, and an evaluation was made according to the following criteria. The results are shown in Table 14.

A: 0 (per 20 sheets)
B: 1 (per 20 sheets)
C: 2 to 3 (per 20 sheets)
D: 4 to 8 (per 20 sheets)
E: 9 or more (per 20 sheets)

[Coloring Tendency of a Film]

The laminated film obtained in the above "Production of a laminated film" was heated at 230° C. and a pressure of 2 MPa for 3 hours. A yellow index of the laminated film before and after the heating was measured and from a difference (ΔYI) in a yellow index between these, coloring tendency was evaluated according to the following criteria. Measurement was conducted using SM color computer "SM-T-H" from Suga Test Instruments Co., Ltd. in accordance with JIS K 7105. The results are shown in Table 14.

A: less than 0.5
B: 0.5 or more and less than 1.0
C: 1.0 or more and less than 2.0
D: 2.0 or more and less than 3.0
E: 3.0 or more

[Production of a Monolayer Film Using a Recovery]

A laminated film obtained in the above "laminated film" was cut into 1 cm×1 cm pieces. With a ratio of 70 parts by mass of unused powdery PVB-1 and 30 parts by mass of castor oil (glycerin tricarboxylic acid ester; 86% by mass of carboxylic acid ester portion was a ricinoleate, 13% by mass was any of a palmitate, a stearate, an oleate, a linoleate and a linolenate, and 1% by mass was another carboxylate; the hydroxy number per one molecule was 2.6; hydroxyl value: 160 mg KOH/g, number average molecular weight based on a hydroxyl value: 910) as a plasticizer to 100 parts by mass of the laminated film obtained by cutting, these materials were melt-kneaded at 180° C. and 50 rpm for 5 min using Labo Plastomill "Model C" from Toyo Seiki Seisaku-Sho, Ltd. The sample after kneading was hot-pressed (170° C., 30 min), to afford a 20 cm×20 cm monolayer film with a thickness of 760 μm.

[Coloring Tendency of a Monolayer Film Using a Recovery]

The monolayer film obtained in the above "production of a monolayer film using a recovery" was heated at 230° C. and a pressure of 2 MPa for 3 hours. A yellow index of the monolayer film before and after the heating was measured and from a difference (ΔYI) in a yellow index between these, coloring tendency was evaluated according to the following criteria. Measurement was conducted using SM color computer "SM-T-H" from Suga Test Instruments Co., Ltd. in accordance with JIS K 7105. The results are shown in Table 15.

A: less than 0.5
B: 0.5 or more and less than 1.0
C: 1.0 or more and less than 2.0
D: 2.0 or more and less than 3.0
E: 3.0 or more

[Haze in Monolayer Film Using a Recovery]

Using the monolayer film obtained in the above "production of a recovered/recycled monolayer PVB film", one laminated glass was produced as described for the above method (undissolved materials in a film). For the laminated glass obtained, haze in laminated glass-1 was measured using a haze meter (HZ-1) from Suga Test Instruments Co., Ltd. and was evaluated according to the following criteria. The results are shown in Table 15.

A: less than 0.5
B: 0.5 or more and less than 1.0
C: 1.0 or more and less than 2.0
D: 2.0 or more and less than 3.0
E: 3.0 or more Examples 2 to 5

Films were produced and evaluated as described for Example 1, except that a PVB used for a layer (X), a PVB used for a layer (Y) and a PVB added to a recovery were changed as shown in Tables 14 and 15, respectively. The results are shown in Tables 14 and 15.

Examples 6 and 7

Films were produced and evaluated as described for Example 1, except that a PVB used for producing a layer (X) and a PVB added to a recovery were changed as shown in Tables 14 and 15, respectively and a plasticizer used for the layer (X) and the layer (Y) was changed to dibutoxyethyl adipate. The results are shown in Tables 14 and 15.

Example 8

A film was produced and evaluated as described for Example 1, except that a PVB used for a layer (X), a PVB used for a layer (Y) and a PVB added to a recovery were changed as shown in Tables 14 and 15, respectively. The results are shown in Tables 14 and 15.

Examples 9 to 11

Films were produced and evaluated as described for Example 1, except that plasticizers added to a recovery were changed as shown in Tables 14 and 15, respectively. The results are shown in Tables 14 and 15.

Comparative Examples 1 to 3, 5, 7 to 9

Films were produced and evaluated as described for Example 1, except that a PVB used for producing a layer (X), a PVB used for producing a layer (Y) and a PVB added to a recovery were changed as shown in Tables 14 and 15, respectively. The results are shown in Tables 14 and 15.

Comparative Examples 4 and 6

Films were produced and evaluated as described for Example 1, except that a PVB used for producing a layer (X), a PVB used for producing a layer (Y) and a PVB added to a recovery were as shown in Tables 14 and 15, respectively and a plasticizer used for the layer (X) and the layer (Y) was changed to dibutoxyethyl adipate. The results are shown in Tables 14 and 15.

TABLE 14

| Examples and Comparative Examples | GPC measurement results | | | | Evaluation of multilayer PVB film | | |
|---|---|---|---|---|---|---|---|
| | (A − B)/A | (A − C)/A | (b/y)/(a/x) | (c/y)/(a/x) | Layer configuration and thickness of each layer (μm) | Undissolved materials | Resistance to coloration |
| Example 1 | 0.51 | 0.52 | $2.56 * 10^{-2}$ | $1.45 * 10^{-2}$ | PVB-1/PVB-11/PVB-1 320/120/320 | A | A |
| Example 2 | 0.60 | 0.55 | $1.45 * 10^{-2}$ | $7.54 * 10^{-3}$ | PVB-2/PVB-12/PVB-2 320/120/320 | B | A |
| Example 3 | 0.31 | 0.37 | $1.76 * 10^{-1}$ | $5.64 * 10^{-2}$ | PVB-3/PVB-13/PVB-3 320/120/320 | A | B |
| Example 4 | 0.24 | 0.39 | $1.10 * 10^{-2}$ | $5.43 * 10^{-3}$ | PVB-4/PVB-14/PVB-4 320/120/320 | C | A |
| Example 5 | 0.37 | 0.47 | $1.02 * 10^{-1}$ | $5.06 * 10^{-2}$ | PVB-5/PVB-11/PVB-5 320/120/320 | A | B |
| Example 6 | 0.55 | 0.55 | $3.56 * 10^{-2}$ | $1.83 * 10^{-2}$ | PVB-6/PVB-11/PVB-6 320/120/320 | B | A |
| Example 7 | 0.54 | 0.53 | $3.12 * 10^{-2}$ | $1.55 * 10^{-2}$ | PVB-7/PVB-11/PVB-7 320/120/320 | B | A |

TABLE 14-continued

| Examples and Comparative Examples | GPC measurement results | | | | Evaluation of multilayer PVB film | | |
|---|---|---|---|---|---|---|---|
| | (A − B)/A | (A − C)/A | (b/y)/(a/x) | (c/y)/(a/x) | Layer configuration and thickness of each layer (μm) | Undissolved materials | Resistance to coloration |
| Example 8 | 0.49 | 0.49 | $2.21 * 10^{-2}$ | $1.39 * 10^{-2}$ | PVD-8/PVB-15/PVB-8 320/120/320 | A | B |
| Example 9 | 0.51 | 0.52 | $2.56 * 10^{-2}$ | $1.45 * 10^{-2}$ | PVB-1/PVB-11/PVB-1 320/120/320 | A | A |
| Example 10 | 0.51 | 0.52 | $2.56 * 10^{-2}$ | $1.45 * 10^{-2}$ | PVB-1/PVB-11/PVB-1 320/120/320 | A | A |
| Example 11 | 0.51 | 0.52 | $2.56 * 10^{-2}$ | $1.45 * 10^{-2}$ | PVB-1/PVB-11/PVB-1 320/120/320 | A | A |
| Comparative Example 1 | 0.59 | 0.58 | $3.20 * 10^{-3}$ | $2.41 * 10^{-3}$ | Comparative PVB-1/Comparative PVB-12/ Comparative PVB-1 320/120/320 | E | A |
| Comparative Example 2 | 0.20 | 0.22 | $3.06 * 10^{-1}$ | $1.25 * 10^{-1}$ | Comparative PVB-2/Comparative PVB-13/ Comparative PVB-2 320/120/320 | A | E |
| Comparative Example 3 | 0.25 | 0.26 | $2.56 * 10^{-1}$ | $8.41 * 10^{-2}$ | Comparative PVB-3/Comparative PVB-13/ Comparative PVB-3 320/120/320 | A | D |
| Comparative Example 4 | 0.57 | 0.56 | $4.79 * 10^{-3}$ | $3.10 * 10^{-3}$ | Comparative PVB-4/Comparative PVB-12/ Comparative PVB-4 320/120/320 | E | A |
| Comparative Example 5 | 0.59 | 0.47 | $4.39 * 10^{-3}$ | $2.31 * 10^{-3}$ | Comparative PVB-5/Comparative PVB-14/ Comparative PVB-5 320/120/320 | E | A |
| Comparative Example 6 | 0.18 | 0.21 | $3.09 * 10^{-1}$ | $1.27 * 10^{-1}$ | Comparative PVB-6/Comparative PVB-13/ Comparative PVB-6 320/120/320 | B | E |
| Comparative Example 7 | 0.21 | 0.24 | $3.03 * 10^{-1}$ | $1.23 * 10^{-1}$ | Comparative PVB-7/Comparative PVB-15/ Comparative PVB-7 320/120/320 | A | E |
| Comparative Example 8 | 0.58 | 0.59 | $9.86 * 10^{-3}$ | $4.91 * 10^{-3}$ | Comparative PVB-1/PVB-11/ Comparative PVB-1 320/120/320 | D | A |
| Comparative Example 9 | 0.25 | 0.28 | $2.41 * 10^{-1}$ | $1.03 * 10^{-1}$ | Comparative PVB-2/PVB-11/ Comparative PVB-2 320/120/320 | A | E |

TABLE 15

| Examples and Comparative Examples | Evaluation of a monomer film produced using a recovery | | | | |
|---|---|---|---|---|---|
| | PVB No./Amount[1] (parts by mass) | Plasticizer/Amount[2] (parts by mass) | Fuming during melt-kneading | Resistance to coloration | Haze |
| Example 1 | PVB-1/70 | Castor oil/30 | None | A | A |
| Example 2 | PVB-2/70 | Castor oil/30 | None | A | B |
| Example 3 | PVB-3/70 | Castor oil/30 | None | B | A |
| Example 4 | PVB-4/70 | Castor oil/30 | None | A | C |
| Example 5 | PVB-5/70 | Castor oil/30 | None | B | A |
| Example 6 | PVB-6/70 | Castor oil/30 | None | A | B |
| Example 7 | PVB-7/70 | Castor oil/30 | None | A | B |
| Example 8 | PVB-8/70 | Castor oil/30 | None | B | A |
| Example 9 | PVB-1/70 | Triethyleneglycol-mono-2-ethyl hexanoate/30 | Observed | A | C |
| Example 10 | PVB-1/70 | Triethyleneglycol-di-2-ethyl hexanoate/30 | None | A | D |
| Example 11 | PVB-1/70 | Polyoxyethylene mono-4-methylphenyl ether[3]/30 | None | A | A |
| Comparative Example 1 | Comparative PVB-1/70 | Castor oil/30 | None | A | E |
| Comparative Example 2 | Comparative PVB-2/70 | Castor oil/30 | None | E | A |
| Comparative Example 3 | Comparative PVB-3/70 | Castor oil/30 | None | D | A |
| Comparative Example 4 | Comparative PVB-4/70 | Castor oil/30 | None | A | E |
| Comparative Example 5 | Comparative PVB-5/70 | Castor oil/30 | None | A | E |
| Comparative Example 6 | Comparative PVB-6/70 | Castor oil/30 | None | E | B |
| Comparative Example 7 | Comparative PVB-7/70 | Castor oil/30 | None | E | A |
| Comparative Example 8 | Comparative PVB-1/70 | Castor oil/30 | None | A | D |
| Comparative Example 9 | Comparative PVB-2/70 | Castor oil/30 | None | E | A |

[1] The amount of PVB based on 100 parts by mass of a recovery
[2] The amount of a plasticizer based on 100 parts by mass of a recovery
[3] An average repeating-unit number of a polyoxyethylene moiety is 5.

Example 12

[Production of a Layer (X)]

A film was produced as described for Example 1, except that a film thickness was changed to 310 μm.

[Production of a Layer (Y)]

A film was produced as described for Example 1, except that 36.6 parts by mass of synthetic powdery PVB-16 and 27.4 parts by mass of triethyleneglycol-di-2-ethyl hexanoate as a plasticizer were used for melt kneading and a film thickness was changed to 140 μm.

[Production of a Laminated Film]

The layer (X) and the layer (Y) were piled in the order of layer (X)/layer (Y)/layer (X), which was pressed under the conditions of 135° C. and 10 kg/cm² in a mold form with a thickness of 760 μm, to afford a laminate film having the configuration of layer (X)(310 μm)/layer (Y)(140 μm)/layer (X)(310 μm).

The laminated film obtained was evaluated as described for Example 1. Furthermore, a monolayer film from a recovery was produced and evaluated as described for Example 1, except that the laminated film obtained was used as a recovery. The results are shown in Tables 16 and 17.

Comparative Examples 10 to 13

Films were produced and evaluated as described for Example 12, except that a PVB used for producing a layer (X), a PVB used for producing a layer (Y) and a PVB added to a recovery were changed as shown in Tables 16 and 17, respectively. The results are shown in Tables 16 and 17.

TABLE 16

| Examples and Comparative Examples | GPC measurement results | | | | Evaluation of multilayer PVB film | | |
|---|---|---|---|---|---|---|---|
| | $(A-B)/A$ | $(A-C)/A$ | $(b/y)/(a/x)$ | $(c/y)/(a/x)$ | Layer configuration and thickness of each layer (μm) | Undissolved materials | Resistance to coloration |
| Example 12 | 0.51 | 0.53 | $2.58 * 10^{-2}$ | $1.49 * 10^{-2}$ | PVB-1/PVB-16/PVB-1 310/140/310 | A | A |
| Comparative Example 10 | 0.64 | 0.63 | $4.54 * 10^{-3}$ | $2.46 * 10^{-3}$ | Comparative PVB-1/Comparative PVB-16/Comparative PVB-1 310/140/310 | E | A |
| Comparative Example 11 | 0.21 | 0.25 | $2.96 * 10^{-1}$ | $1.20 * 10^{-1}$ | Comparative PVB-2/Comparative PVB-17/Comparative PVB-2 310/140/310 | A | E |
| Comparative Example 12 | 0.56 | 0.60 | $9.97 * 10^{-3}$ | $4.98 * 10^{-3}$ | Comparative PVB-1/PVB-16/Comparative PVB-1 310/140/310 | D | A |
| Comparative Example 13 | 0.26 | 0.31 | $2.35 * 10^{-1}$ | $1.01 * 10^{-1}$ | Comparative PVB-2/PVB-16/Comparative PVB-2 310/140/310 | A | D |

TABLE 17

| Examples and Comparative Examples | Evaluation of a monomer film produced using a recovery | | | | |
|---|---|---|---|---|---|
| | PVB No./Amount[1] (parts by mass) | Plasticizer/Amount[2] (parts by mass) | Fuming during melt-kneading | Resistance to coloration | Haze |
| Example 12 | PVB-1/70 | Castor oil/30 | None | A | A |
| Comparative Example 10 | Comparative PVB-1/70 | Castor oil/30 | None | A | E |
| Comparative Example 11 | Comparative PVB-2/70 | Castor oil/30 | None | E | A |
| Comparative Example 12 | Comparative PVB-1/70 | Castor oil/30 | None | A | D |
| Comparative Example 13 | Comparative PVB-2/70 | Castor oil/30 | None | D | A |

[1] The amount of PVB based on 100 parts by mass of a recovery

[2] The amount of a plasticizer based on 100 parts by mass of a recovery

Example 13

[Production of a Layer (X)]

A film was produced as described for Example 1, except that a film thickness was changed to 300 μm.

[Production of a Layer (Y)]

A film was produced as described for Example 1, except that 32 parts by mass of synthetic powdery PVB-17 and 32 parts by mass of triethyleneglycol-di-2-ethyl hexanoate as a plasticizer were used for melt kneading and a film thickness was changed to 160 μm.

[Production of a Laminated Film]

The layer (X) and the layer (Y) were piled in the order of layer (X)/layer (Y)/layer (X), which was pressed under the conditions of 135° C. and 10 kg/cm² in a mold form with a thickness of 760 μm, to afford a laminate film having the configuration of layer (X)(300 μm)/layer (Y)(160 μm)/layer (X)(300 μm).

The laminated film obtained was evaluated as described for Example 1. Furthermore, a monolayer film from a recovery was produced and evaluated as described for Example 1, except that the laminated film obtained was used as a recovery and the amounts of the newly-added PVB and the plasticizer were changed as shown in Tables 18 and 19. The results are shown in Tables 18 and 19.

Comparative Examples 14 to 17

Films were produced and evaluated as described for Example 13, except that a PVB used for producing a layer (X), a PVB used for producing a layer (Y) and a PVB added to a recovery were changed as shown in Tables 18 and 19, respectively. The results are shown in Tables 18 and 19.

TABLE 18

| Examples and Comparative Examples | GPC measurement results | | | | Evaluation of multilayer PVB film | | |
|---|---|---|---|---|---|---|---|
| | (A − B)/A | (A − C)/A | (b/y)/(a/x) | (c/y)/(a/x) | Layer configuration and thickness of each layer (μm) | Undissolved materials | Resistance to coloration |
| Example 13 | 0.57 | 0.56 | $2.49 * 10^{-2}$ | $1.45 * 10^{-2}$ | PVB-1/PVB-17/PVB-1 300/160/300 | A | A |
| Comparative Example 14 | 0.65 | 0.63 | $4.50 * 10^{-3}$ | $2.45 * 10^{-3}$ | Comparative PVB-1/ Comparative PVB-18/ Comparative PVB-1 300/160/300 | E | A |
| Comparative Example 15 | 0.26 | 0.31 | $2.97 * 10^{-1}$ | $1.15 * 10^{-1}$ | Comparative PVB-2/ Comparative PVB-19/ Comparative PVB-2 300/160/300 | A | E |
| Comparative Example 16 | 0.64 | 0.62 | $9.87 * 10^{-3}$ | $4.92 * 10^{-3}$ | Comparative PVB-1/ PVB-17/Comparative PVB-1 300/160/300 | D | A |
| Comparative Example 17 | 0.33 | 0.34 | $2.27 * 10^{-1}$ | $9.79 * 10^{-2}$ | Comparative PVB-2/ PVB-17/Comparative PVB-2 300/160/300 | A | E |

TABLE 19

| Examples and Comparative Examples | Evaluation of a monomer film produced using a recovery | | | | |
|---|---|---|---|---|---|
| | PVB No./Amount[1] (parts by mass) | Plasticizer/Amount[2] (parts by mass) | Fuming during melt-kneading | Resistance to coloration | Haze |
| Example 13 | PVB-1/68 | Castor oil/32 | None | A | B |
| Comparative Example 14 | Comparative PVB-1/68 | Castor oil/32 | None | A | E |
| Comparative Example 15 | Comparative PVB-2/68 | Castor oil/32 | None | E | B |
| Comparative Example 16 | Comparative PVB-1/68 | Castor oil/32 | None | A | D |
| Comparative Example 17 | Comparative PVB-2/68 | Castor oil/32 | None | E | B |

[1]The amount of PVB based on 100 parts by mass of a recovery

[2]The amount of a plasticizer based on 100 parts by mass of a recovery

Example 14

[Production of a Layer (X)]

A film was produced as described for Example 1, except that 46 parts by mass of a synthetic powdery PVB-9 and 23 parts by mass of triethyleneglycol-di-2-ethyl hexanoate as a plasticizer were used for melt kneading.

[Production of a Layer (Y)]

A film was produced as described for Example 1, except that 36.6 parts by mass of synthetic powdery PVB-16 and 27.4 parts by mass of triethyleneglycol-di-2-ethyl hexanoate as a plasticizer were used for melt kneading.

[Production of a Laminated Film]

The layer (X) and the layer (Y) were piled in the order of layer (X)/layer (Y)/layer (X), which was pressed under the conditions of 135° C. and 10 kg/cm² in a mold form with a thickness of 760 μm, to afford a laminate film having the configuration of layer (X) (320 μm)/layer (Y) (120 μm)/layer (X) (320 μm).

The laminated film obtained was evaluated as described for Example 1. Furthermore, a monolayer film from a recovery was produced and evaluated respectively as described for Example 1, except that the laminated film obtained was used as a recovery and the type and the amount of the newly-added PVB and the amount of the plasticizer were changed as shown in Tables 20 and 21. The results are shown in Tables 20 and 21.

Comparative Examples 18 to 21

Films were produced and evaluated as described for Example 14, except that a PVB used for producing a layer (X), a PVB used for producing a layer (Y) and a PVB added to a recovery were as shown in Tables 20 and 21, respectively. The results are shown in Tables 20 and 21.

TABLE 20

| Examples and Comparative Examples | GPC measurement results | | | | Evaluation of multilayer PVB film | | |
|---|---|---|---|---|---|---|---|
| | (A − B)/A | (A − C)/A | (b/y)/(a/x) | (c/y)/(a/x) | Layer configuration and thickness of each layer (μm) | Undissolved materials | Resistance to coloration |
| Example 14 | 0.68 | 0.64 | $2.45 \times 10^{-2}$ | $1.43 \times 10^{-2}$ | PVB-9/PVB-16/PVB-9 320/120/320 | A | A |
| Comparative Example 18 | 0.84 | 0.86 | $4.11 \times 10^{-3}$ | $2.32 \times 10^{-3}$ | Comparative PVB-8/Comparative PVB-16/Comparative PVB-8 320/120/320 | E | A |
| Comparative Example 19 | 0.30 | 0.33 | $2.54 \times 10^{-1}$ | $9.67 \times 10^{-2}$ | Comparative PVB-9/Comparative PVB-17/Comparative PVB-9 320/120/320 | A | E |
| Comparative Example 20 | 0.78 | 0.83 | $9.78 \times 10^{-3}$ | $4.85 \times 10^{-3}$ | Comparative PVB-8/PVB-16/Comparative PVB-8 320/120/320 | D | A |
| Comparative Example 21 | 0.33 | 0.38 | $2.02 \times 10^{-1}$ | $8.03 \times 10^{-2}$ | Comparative PVB-9/PVB-16/Comparative PVB-9 320/120/320 | A | E |

TABLE 21

| Examples and Comparative Examples | Evaluation of a monomer film produced using a recovery | | | | |
|---|---|---|---|---|---|
| | PVB No./Amount[1] (parts by mass) | Plasticizer/Amount[2] (parts by mass) | Fuming during melt-kneading | Resistance to coloration | Haze |
| Example 14 | PVB-9/67 | Castor oil/33 | None | A | A |
| Comparative Example 18 | Comparative PVB-8/67 | Castor oil/33 | None | A | E |
| Comparative Example 19 | Comparative PVB-9/67 | Castor oil/33 | None | E | A |
| Comparative Example 20 | Comparative PVB-8/67 | Castor oil/33 | None | A | D |
| Comparative Example 21 | Comparative PVB-9/67 | Castor oil/33 | None | E | A |

[1]The amount of PVB based on 100 parts by mass of a recovery

[2]The amount of a plasticizer based on 100 parts by mass of a recovery

Example 15

[Production of a Layer (X)]

A film was produced as described for Example 1, except that 46 parts by mass of a synthetic powdery PVB-9 and 23 parts by mass of triethyleneglycol-di-2-ethyl hexanoate as a plasticizer were used for melt kneading and a film thickness was changed to 310 μm.

[Production of a Layer (Y)]

A film was produced as described for Example 1, except that 32 parts by mass of synthetic powdery PVB-17 and 32 parts by mass of triethyleneglycol-di-2-ethyl hexanoate as a plasticizer were used for melt kneading and a film thickness was changed to 140 μm.

[Production of a Laminated Film]

The layer (X) and the layer (Y) were piled in the order of layer (X)/layer (Y)/layer (X), which was pressed under the conditions of 135° C. and 10 kg/cm² in a mold form with a thickness of 760 μm, to afford a laminate film having the configuration of layer (X) (310 μm)/layer (Y) (140 μm)/layer (X) (310 μm).

The laminated film obtained was evaluated as described for Example 1. Furthermore, a monolayer film and a multilayer film from a recovery were produced and evaluated respectively as described for Example 1, except that the laminated film obtained was used as a recovery and the type and the amount of the newly-added PVB and the amount of the plasticizer were changed as shown in Tables 22 and 23. The results are shown in Tables 22 and 23.

Comparative Examples 22 to 25

Films were produced and evaluated as described for Example 15, except that a PVB used for producing a layer (X), a PVB used for producing a layer (Y) and a PVB added to a recovery were changed as shown in Tables 22 and 23, respectively. The results are shown in Tables 22 and 23.

TABLE 22

| Examples and Comparative Examples | GPC measurement results | | | | Evaluation of multilayer PVB film | | |
|---|---|---|---|---|---|---|---|
| | (A − B)/A | (A − C)/A | (b/y)/(a/x) | (c/y)/(a/x) | Layer configuration and thickness of each layer (μm) | Undissolved materials | Resistance to coloration |
| Example 15 | 0.73 | 0.66 | $2.38 * 10^{-2}$ | $1.40 * 10^{-2}$ | PVB-9/PVB-17/PVB-9 310/140/310 | A | A |
| Comparative Example 22 | 0.84 | 0.85 | $4.10 * 10^{-3}$ | $2.32 * 10^{-3}$ | Comparative PVB-8/ Comparative PVB-18/ Comparative PVB-8 310/140/310 | E | A |
| Comparative Example 23 | 0.34 | 0.38 | $2.56 * 10^{-1}$ | $9.26 * 10^{-2}$ | Comparative PVB-9/ Comparative PVB-19/ Comparative PVB-9 310/140/310 | A | E |
| Comparative Example 24 | 0.83 | 0.85 | $9.49 * 10^{-3}$ | $4.82 * 10^{-3}$ | Comparative PVB-8/ PVB-17/Comparative PVB-8 310/140/310 | D | A |
| Comparative Example 25 | 0.39 | 0.40 | $2.05 * 10^{-1}$ | $7.80 * 10^{-2}$ | Comparative PVB-9/ PVB-17/Comparative PVB-9 310/140/310 | A | D |

TABLE 23

| Examples and Comparative Examples | Evaluation of a monomer film produced using a recovery | | | | |
|---|---|---|---|---|---|
| | PVB No./Amount[1] (parts by mass) | Plasticizer/Amount[2] (parts by mass) | Fuming during melt-kneading | Resistance to coloration | Haze |
| Example 15 | PVB-9/63 | Castor oil/37 | None | A | B |
| Comparative Example 22 | Comparative PVB-8/63 | Castor oil/37 | None | A | E |
| Comparative Example 23 | Comparative PVB-9/63 | Castor oil/37 | None | E | B |
| Comparative Example 24 | Comparative PVB-8/63 | Castor oil/37 | None | A | D |
| Comparative Example 25 | Comparative PVB-9/63 | Castor oil/37 | None | D | B |

[1]The amount of PVB based on 100 parts by mass of a recovery

[2]The amount of a plasticizer based on 100 parts by mass of a recovery

Example 16

[Production of a Layer (X)]

A film was produced as described for Example 1, except that 40.6 parts by mass of a synthetic powdery PVB-10 and 28.4 parts by mass of triethyleneglycol-di-2-ethyl hexanoate as a plasticizer were used for melt kneading.

[Production of a Layer (Y)]

A film was produced as described for Example 1, except that 32 parts by mass of synthetic powdery PVB-17 and 32 parts by mass of triethyleneglycol-di-2-ethyl hexanoate as a plasticizer were used for melt kneading.

[Production of a Laminated Film]

The layer (X) and the layer (Y) were piled in the order of layer (X)/layer (Y)/layer (X), which was pressed under the conditions of 135° C. and 10 kg/cm² in a mold form with a thickness of 760 μm, to afford a laminate film having the configuration of layer (X) (320 μm)/layer (Y) (120 μm)/layer (X) (320 μm).

The laminated film obtained was evaluated as described for Example 1. Furthermore, a monolayer film and a multilayer film from a recovery were produced and evaluated respectively as described for Example 1, except that the laminated film obtained was used as a recovery and the type and the amount of the newly-added PVB and the amount of the plasticizer were changed as shown in Tables 24 and 25. The results are shown in Tables 24 and 25.

Comparative Examples 26 to 29

Films were produced and evaluated as described for Example 1, except that a PVB used for producing a layer (X), a PVB used for producing a layer (Y) and a PVB added to a recovery were changed as shown in Tables 24 and 25, respectively. The results are shown in Tables 24 and 25.

TABLE 24

| Examples and Comparative Examples | GPC measurement results | | | | Evaluation of multilayer PVB film | | |
|---|---|---|---|---|---|---|---|
| | (A − B)/A | (A − C)/A | (b/y)/(a/x) | (c/y)/(a/x) | Layer configuration and thickness of each layer (μm) | Undissolved materials | Resistance to coloration |
| Example 16 | 0.75 | 0.77 | $2.03 * 10^{-2}$ | $1.23 * 10^{-2}$ | PVB-10/PVB-17/PVB-10 320/120/320 | A | B |
| Comparative Example 26 | 0.87 | 0.88 | $3.84 * 10^{-3}$ | $2.18 * 10^{-3}$ | Comparative PVB-10/ Comparative PVB-18/ Comparative PVB-10 320/120/320 | D | A |
| Comparative Example 27 | 0.39 | 0.36 | $2.47 * 10^{-1}$ | $8.91 * 10^{-2}$ | Comparative PVB-11/ Comparative PVB-19/ Comparative PVB-11 320/120/320 | A | E |
| Comparative Example 28 | 0.86 | 0.87 | $8.47 * 10^{-3}$ | $4.58 * 10^{-3}$ | Comparative PVB-10/ PVB-17/Comparative PVB-10 320/120/320 | D | B |
| Comparative Example 29 | 0.43 | 0.38 | $2.09 * 10^{-1}$ | $7.66 * 10^{-2}$ | Comparative PVB-11/ PVB-17/Comparative PVB-11 320/120/320 | A | E |

TABLE 25

| Examples and Comparative Examples | Evaluation of a monomer film produced using a recovery | | | | |
|---|---|---|---|---|---|
| | PVB No./Amount[1] (parts by mass) | Plasticizer/Amount[2] (parts by mass) | Fuming during melt-kneading | Resistance to coloration | Haze |
| Example 16 | PVB-10/59 | Castor oil/41 | None | B | C |
| Comparative Example 26 | Comparative PVB-10 | Castor oil/41 | None | A | E |
| Comparative Example 27 | Comparative PVB-11 | Castor oil/41 | None | E | C |
| Comparative Example 28 | Comparative PVB-10 | Castor oil/41 | None | B | E |
| Comparative Example 29 | Comparative PVB-11 | Castor oil/41 | None | E | C |

[1]The amount of PVB based on 100 parts by mass of a recovery

[2]The amount of a plasticizer based on 100 parts by mass of a recovery

It is shown that in Examples described above, the multilayer films of the present invention are less colored by heating and contain less foreign materials (undissolved materials). It is further shown that films produced from a recovery of the multilayer films are less colored, contain less foreign materials (undissolved materials) and exhibit excellent transparency.

The invention claimed is:

1. A multilayer film, comprising
a layer (X) comprising a polyvinyl acetal (I) having an acetalization degree of 55 to 80 mol %, a content of a vinyl ester monomer unit of 0.1 to 1.5 mol% and a viscosity-average degree of polymerization of 1,400 to 5,000; and
a layer (Y) comprising a polyvinyl acetal (II) having an acetalization degree of 70 to 85 mol %, a content of a vinyl ester monomer unit of 5 to 15 mol % and a viscosity-average degree of polymerization of 1,400 to 5,000,
wherein the multilayer film satisfies formulas (1) and (2):

$$(A-B)/A<0.80 \qquad (1)$$

$$1.00\times10^{-2}<(b/y)/(a/x)<2.00\times10^{-1} \qquad (2)$$

wherein
"A" is a peak-top molecular weight of a polymer component as measured by a differential refractive index detector in gel-permeation chromatographic measurement of said multilayer film heated at 230° C. for 3 hours;
"a" is a signal strength at the peak-top molecular weight (A);
"B" is a peak-top molecular weight of a polymer component as measured by an absorptiometer at a measuring wavelength of 280 nm in gel-permeation chromatographic measurement of said multilayer film heated at 230° C. for 3 hours;
"b" is a signal strength at the peak-top molecular weight (B);
"x" is a signal strength at a peak-top molecular weight as measured by a differential refractive index detector in gel-permeation chromatographic measurement of a monodisperse polymethyl methacrylate; and
"y" is a signal strength at a peak-top molecular weight as measured by an absorptiometer at a measuring wavelength of 220 nm in gel-permeation chromatographic measurement of said monodisperse polymethyl methacrylate.

2. The multilayer film according to claim 1, which further satisfies formulas (3) and (4):

$$(A-C)/A<0.80 \qquad (3)$$

$$5.00\times10^{-3}<(c/y)/(a/x)<7.00\times10^{-2} \qquad (4)$$

wherein
"A" is as defined in the formula (1);
"a", "x" and "y" are as defined in the formula (2);
"C" is a peak-top molecular weight of a polymer component as measured by an absorptiometer at a measuring wavelength of 320 nm in gel-permeation chromatographic measurement of said multilayer film heated at 230° C. for 3 hours; and
"c" is a signal strength at the peak-top molecular weight (C).

3. The multilayer film according to claim 1, wherein the polyvinyl acetal (I) and the polyvinyl acetal (II) are polyvinyl butyrals.

4. An interlayer film for a laminated glass, consisting of the multilayer film according to claim 1.

5. A laminated glass, consisting of a plurality of glass sheets bonded via the interlayer film according to claim 4.

6. A method for producing a monolayer film, the method comprising:
melt-kneading a recovery of the multilayer film according to claim 1 to obtain a melt-kneaded product and
then forming a film from the melt-kneaded product.

7. The method according to claim 6, comprising
melt-kneading said recovery, a plasticizer, and a polyvinyl acetal (III) having an acetalization degree of 55 to 85 mol %, a content of a vinyl ester monomer unit of 0.1 to 15 mol % and a viscosity-average degree of polymerization of 1,400 to 5,000, to obtain the melt-kneaded product; and
then forming a film from the melt-kneaded product.

* * * * *